(12) United States Patent
Inagaki et al.

(10) Patent No.: US 6,565,939 B2
(45) Date of Patent: May 20, 2003

(54) OPTICAL INFORMATION-RECORDING MEDIUM AND METHOD FOR RECORDING INFORMATION

(75) Inventors: Yoshio Inagaki, Kanagawa (JP); Naoki Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 85 days.

(21) Appl. No.: 09/823,753

(22) Filed: Apr. 3, 2001

(65) Prior Publication Data

US 2002/0022104 A1 Feb. 21, 2002

Related U.S. Application Data

(63) Continuation-in-part of application No. 09/404,598, filed on Sep. 24, 1999, now abandoned.

(30) Foreign Application Priority Data

Sep. 24, 1998 (JP) .......................................... 10-269852

(51) Int. Cl.$^7$ ................................................. B32B 3/02
(52) U.S. Cl. ................ 428/64.1; 428/64.8; 430/270.14; 430/270.2
(58) Field of Search .............................. 428/64.1, 64.4, 428/64.8, 913; 430/270.14, 270.18, 270.19, 270.2, 495.1, 945; 369/283, 288

(56) References Cited

U.S. PATENT DOCUMENTS 5,090,009 A 2/1992 Hamada et al.
5,182,186 A 1/1993 Inagaki et al.
5,273,800 A 12/1993 Satake et al.
5,998,094 A 12/1999 Ishida et al.

Primary Examiner—Elizabeth Mulvaney
(74) Attorney, Agent, or Firm—Sughrue Mion, PLLC

(57) ABSTRACT

A heat mode optical information-recording medium comprising a substrate having thereon a recording layer on which information can be recorded by laser irradiation, wherein said recording layer contains a cyanine dye compound represented by the following general formula (I):

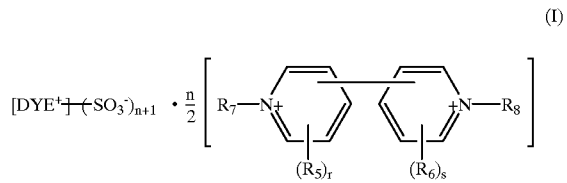

(I)

wherein $DYE^+$ represents a monovalent cyanine dye cation; n represents an integer of 1 or more; $R_5$ and $R_6$ each independently represents a substituent group; $R_7$ and $R_8$ each independently represents an alkyl group, an alkenyl group, an alkynyl group, an aralkyl group, an aryl group or a heterocyclic group; $R_5$ and $R_6$, $R_5$ and $R_7$, $R_6$ and $R_8$ or $R_7$ and $R_8$ may be connected to each other to form a ring; and r and s each independently represents an integer of from 0 to 4 and when r or s is 2 or more, a plurality of $R_5$ groups and a plurality of $R_6$ groups may, respectively, be the same or different from each other.

21 Claims, No Drawings

OPTICAL INFORMATION-RECORDING MEDIUM AND METHOD FOR RECORDING INFORMATION

This is a CIP of application Ser. No. 09/404,598, filed Sep. 24, 1999, now abandoned.

FIELD OF THE INVENTION

The present invention relates to a heat mode type optical information-recording medium which can record and replay information using a laser beam, and a method for recording information. In particular, the present invention relates to a heat mode type optical information-recording medium such as an optical disk-recordable (CD-R) or a digital video disk-recordable (DVD-R), which is suitable for recording information using a near infrared laser beam or a visible laser beam.

BACKGROUND OF THE INVENTION

Optical information-recording media (e.g., optical disks) which can record information only once with laser beams, have hitherto been known. These optical information-recording media are called CD-recordable (so-called CD-R), and have the typical structure that a transparent disk-shaped substrate is laminated with a recording layer comprising an organic dye, a light reflective layer comprising a metal such as gold, and a resin protective layer in this order. Information is recorded on this laminated product by irradiating a near infrared laser beam (usually, a laser beam having a wavelength of about 780 nm) to locally deform the recording layer by heat generation. On the other hand, reading (replay) of the information is usually carried out by irradiating a laser beam having the same wavelength as the laser beam for recording to detect the difference in reflectance between a deformed site (recorded area) of the recording layer by heat generation and a non-deformed site (non-recorded area).

With the recent spread of personal computers, optical information-recording media higher in recording density have been desired. For increasing the recording density, it is effective to decrease the diameter of a laser beam irradiated. Further, it has been theoretically known that a laser beam having a shorter wavelength is effective for an increase in density, because the diameter of the laser beam can be decreased. Accordingly, optical disks for carrying out recording and replay using laser beams having wavelengths shorter than 780 nm, which is a wavelength of the laser beam having hitherto been used, have been developed. For example, optical disks called DVD-recordable (so-called DVD-R) have been proposed. This optical disk is produced so as to provide the structure that two disks each comprising a transparent disk-shaped substrate having a diameter of 120 mm on which pregrooves are formed at a track pitch of 0.8 $\mu$m which is narrower than 1.6 $\mu$m in the CD-R medium and having provided thereon a recording layer comprising a dye and usually further a light reflective layer and a protective layer on the recording layer, or the disk and a disk-shaped protective substrate having the same shape as said disk, are adhered to each other with an adhesive, facing the recording layer inside. In the DVD-R media, recording and replay are carried out by irradiation of a visible laser beam (usually, a laser beam having a wavelength ranging from 630 nm to 680 nm), and higher density recording than that of the CD-R media is possible.

In the design of the above-mentioned DVD-Rs, the absorption maximum wavelength of dyes used in the dye recording layers is required to be decreased to the wavelength of a laser beam used for recording and replay, because it is shorter than that of the laser beam used in the CD-R media. However, the absorption maximum wavelength of dyes is known to be generally increased as the spread of a $\pi$ electron system contributing to the optical absorption thereof increases. In particular, for cyanine dyes which have previously been utilized in many optical disks, the longer length of conjugated methine chains results in the longer wavelength. That is to say, for decreasing the absorption maximum wavelength of dyes, it is effective to decrease the length of conjugated methine chains. However, the shorter length of conjugated methine chains results in the lower coefficient of absorption, so that a reduction in recording sensitivity (a reduction in the degree of modulation) is inevitably liable to occur. It is therefore difficult to obtain a performance satisfactory as the dyes for DVD-R only by decreasing the length of conjugated methine chains of the conventional dyes for CD-R media to decrease the absorption maximum wavelength thereof.

On the other hand, in the CD-R media, the reflectance at 780 nm is required to be as high as readable with commercial CD players. For increasing the amount of light reflected by the light reflective metal layers provided on the dye recording layers, the optical absorptance due to the dyes is preferably low. It is therefore considered that the absorption maximum wavelength of the dyes is preferably low. However, the use of dyes having an absorption maximum wavelength on the short wavelength side raises the problem that changes in reflectance between recorded areas and non-recorded areas at 780 nm become small, which causes the difficulty of detecting the difference therebetween. Accordingly, in the conventional CD-R media, dyes having a high reflectance and giving a high recording sensitivity are selectively used. For example, as such dyes, cyanine dyes having benzoindolenine skeletons described in JP-A-64-40382 (the term "JP-A" as used herein means an "unexamined published Japanese patent application") are preferably used. However, the conventional cyanine dyes do not necessarily satisfy both the reflectance and the recording sensitivity, and further improvement has been desired.

JP-A-4-175188 proposes cyanine dyes suitable for CD-R media having a high reflectance and also giving significant improving effects in recording and replay performances such as the sensitivity and C/N value. These cyanine dyes are described to be able to have monovalent to trivalent anions. However, as specific examples, cyanine dyes are only disclosed in which monovalent anions are combined, and for divalent or trivalent anions, there is no description of how to combine the cyanine dyes.

SUMMARY OF THE INVENTION

An object of the present invention is to provide a heat mode type optical information-recording medium having a high recording sensitivity in recording information using a laser beam.

Another object of the present invention is to provide a heat mode type optical information-recording medium in which a high recording sensitivity is obtained even when a visible laser bean (for example, a red laser beam having a wavelength of 630 nm to 680 nm).

A still other object of the present invention is to provide a method for recording information, and particularly, to provide a method for recording information in which a high recording sensitivity is obtained even when a visible laser beam (for example, a red laser beam having a wavelength of 630 nm to 680 nm).

A yet further object of the present invention is to provide a heat mode type optical information-recording medium which can attain a high recording sensitivity at a high reflectance.

Other objects and effects of the present invention will become apparent from the following description.

As a result of the extensive studies, the present inventors found that optical information-recording media having a high recording sensitivity and showing a high reflectance, compared with the conventional ones, can be produced by using cyanine dye compounds in which multivalent cations are combined with cyanine dye components whose valence is adjusted to the same as that of the cations. In particular, it was found that cyanine dye compounds obtained by combining multivalent anions with cyanine dye components having relatively short conjugated methine chains can be advantageously used in DVD-R type optical information-recording media in which information is recorded using a laser beam having a short wavelength.

That is, the above-described objectives of the present invention have been achieved by providing the following optical information-recording media 1) to 8) and information-recording method 9).

1) A heat mode optical information-recording medium comprising a substrate having thereon a recording layer on which information can be recorded by laser irradiation, wherein said recording layer contains a cyanine dye compound represented by the following general formula (I):

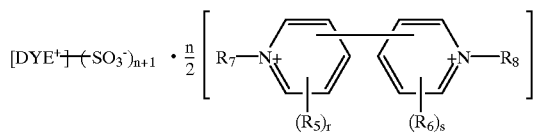

(I)

wherein $DYE^+$ represents a monovalent cyanine dye cation; n represents an integer of 1 or more; $R_5$ and $R_6$ each independently represents a substituent group; $R_7$ and $R_8$ each independently represents an alkyl group, an alkenyl group, an alkynyl group, an aralkyl group, an aryl group or a heterocyclic group; $R_5$ and $R_6$, $R_5$ and $R_7$, $R_6$ and $R_8$ or $R_7$ and $R_8$ may be connected to each other to form a ring; and r and s each independently represents an integer of from 0 to 4 and when r or s is 2 or more, a plurality of $R_5$ groups and a plurality of $R_6$ groups may, respectively, be the same or different from each other.

2) The optical information-recording medium according to the above 1), wherein said cyanine dye cation is represented by the following general formula (II):

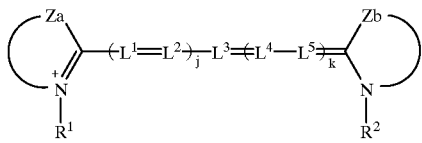

(II)

wherein Za and Zb each independently represents an atomic group necessary for completing a 5- or 6-membered nitrogen-containing heterocycle; $R^1$ and $R^2$ each independently represents an alkyl group or an aryl group; $L^1, L^2, L^3, L^4$ and $L^5$ each independently represents a substituted or unsubstituted methine group, with the proviso that when substituent groups exist on $L^1$ to $L^5$, they may be connected to each other to form a ring; j represents 0, 1 or 2; and k represents 0 or 1.

3) The optical information-recording medium according to the above 1), wherein said cyanine dye cation is represented by the following general formula (IIA):

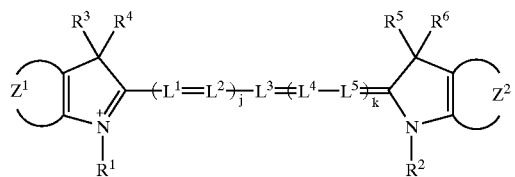

(IIA)

wherein $Z^1$ and $Z^2$ each independently represents an atomic group necessary for completing an indolenine nucleus or a benzoindolenine nucleus; $R^1$ and $R^2$ each independently represents an alkyl group or an aryl group; $R^3, R^4, R^5$ and $R^6$ each independently represents an alkyl group; $L^1, L^2, L^3, L^4$ and $L^5$ each independently represents a substituted or unsubstituted methine group, with the proviso that when substituent groups exist on $L^1$ to $L^5$, they may be connected to each other to form a ring; j represents 0, 1 or 2; and k represents 0 or 1.

4) The optical information-recording medium according to any one of the above 1) to 3),
wherein said substrate is a transparent disk-shaped substrate having a diameter of 120±0.3 mm, a thickness of 1.2±0.2 mm and pregrooves formed on one surface thereof at a track pitch of 1.4 μm to 1.8 μm, and
wherein said recording layer is provided on the pregroove-formed surface of the substrate.

5) The optical information-recording medium according to any one of the above 1) to 3),
wherein said substrate is a transparent disk-shaped substrate having a diameter of 120±0.3 mm, a thickness of 0.6±0.1 mm and pregrooves formed on one surface thereof at a track pitch of 0.6 μm to 0.9 μm, and
wherein said recording layer is provided on the pregroove-formed surface of the substrate.

6) The optical information-recording medium according to the above 5), which comprises two sets of said substrate each having thereon the recording layer, wherein said two sets of the substrate are laminated so that the respective substrate side thereof becomes outermost side.

7) The optical information-recording medium according to the above 5), further comprising a disk-shaped protective substrate having the same shape as said disk-shaped substrate, said disk-shaped protective substrate being provided on the recording layer side.

8) The optical information-recording medium according to any one of the above 1) to 6), further comprising a light reflective metal layer provided on the recording layer.

9) A method for recording information, comprising irradiating an optical information-recording medium with a laser beam having a wavelength of 630 nm to 680 nm, wherein said optical information-recording medium is one according to any one of the above 1) to 3) and 5) to 8).

In a preferred embodiment, j in formula (II) and (IIA) is 0 or 1.

In another preferred embodiment, the cyanine dye compound comprises an indolenine nucleus or a benzoindolenine nucleus having a trimethine chain.

In a yet other preferred embodiment, a protective layer is provided on the light reflective metal layer.

The present invention also relates to the following optical information-recording media 10) to 17) and information-recording method 18).

10) An optical information-recording medium comprising a substrate having thereon a recording layer on which information can be recorded by laser irradiation, wherein said recording layer contains a cyanine dye compound represented by the following general formula (III):

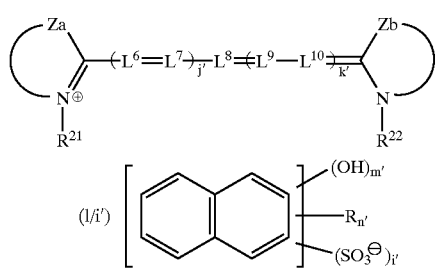

wherein $Z^a$ and $Z^b$ each independently represents an atomic group necessary for completing a 5- or 6-membered nitrogen-containing heterocycle; $R^{21}$ and $R^{22}$ each independently represents a substituted or unsubstituted alkyl group or a substituted or unsubstituted aryl group; $L^6$, $L^7$, $L^8$, $L^9$ and $L^{10}$ each independently represents a substituted or unsubstituted methine group, with the proviso that when substituent groups exist on $L^6$ to $L^{10}$, they may be connected to each other to form a ring; R represents a substituent group; i' represents an integer of from 2 to 7; j' represents 0, 1 or 2; k' represents 0 or 1; m' represents an integer of from 1 to 4; n' represents an integer of 0 to 7; m'+n'+i' is 8 or less; when n' is 2 or more, a plurality of R groups may be the same or different; and when m'=i'=2, two hydroxyl groups are not each concurrently substituted at the 1- and 8-positions.

11) The optical information-recording medium according to the above 10), wherein said cyanine dye compound of formula (III) is a compound represented by the following formula (IV):

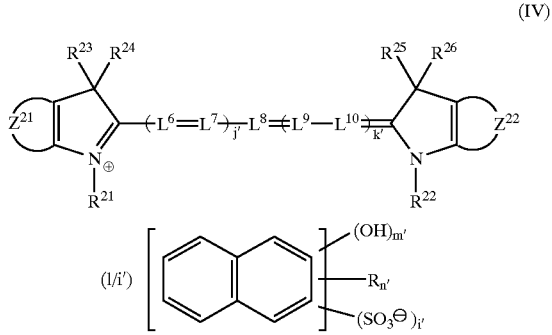

wherein $Z^{21}$ and $Z^{22}$ each independently represents an atomic group necessary for forming an indolenine nucleus or a benzoindolenine nucleus; $R^{21}$ and $R^{22}$ each independently represents a substituted or unsubstituted alkyl group or a substituted or unsubstituted aryl group; $R^{23}$, $R^{24}$ $R^{25}$ and $R^{26}$ each independently represents a substituted or unsubstituted alkyl group; and $L^6$, $L^7$, $L^8$, $L^9$, $L^{10}$, R, i', j', k', m' and n' respectively have the same meanings as defined for general formula (III).

12) The optical information-recording medium according to the above 10), wherein said cyanine dye compound of formula (III) is a compound represented by the following formula (V):

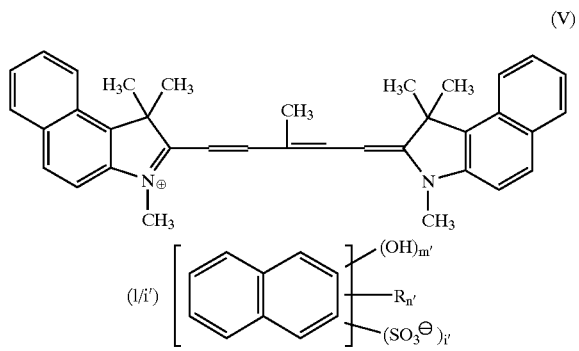

wherein R, i', m' and n' respectively have the same meanings as defined for general formula (III).

13) The optical information-recording medium according to any one of the above 10) to 12), wherein said substrate is a transparent disk-shaped substrate having a diameter of 120±0.3 mm, a thickness of 1.2±0.2 mm and pregrooves formed on one surface thereof at a track pitch of 1.4 μm to 1.8 μm, and wherein said recording layer is provided on the pregroove-formed surface of the substrate.

14) The optical information-recording medium according to any one of the above 10) to 12), wherein said substrate is a transparent disk-shaped substrate having a diameter of 120±0.3 mm, a thickness of 0.6±0.1 mm and pregrooves formed on one surface thereof at a track pitch of 0.6 μm to 0.9 μm, and wherein said recording layer is provided on the pregroove-formed surface of the substrate.

15) The optical information-recording medium according to the above 14), which comprises two sets of said substrate each having thereon the recording layer, wherein said two sets of the substrate are laminated so that the respective substrate side thereof becomes outermost side.

16) The optical information-recording medium according to the above 14), further comprising a disk-shaped protective substrate having the same shape as said disk-shaped substrate, said disk-shaped protective substrate being provided on the recording layer side.

17) The optical information-recording medium according to any one of the above 10) to 16), further comprising a light reflective metal layer provided on the recording layer.

18) A method for recording information, comprising irradiating an optical information-recording medium with a laser beam having a wavelength of 630 nm to 680 nm, wherein said optical information-recording medium is one according to any one of the above 10) to 12) and 14) to 17).

DETAILED DESCRIPTION OF THE INVENTION

The optical information-recording medium of the present invention comprises a recording layer containing the cyanine dye compound represented by the following general formula (I):

(I)

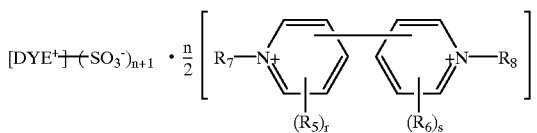

wherein DYE⁺ represents a monovalent cyanine dye cation; n represents an integer of 1 or more; $R_5$ and $R_6$ each independently represents a substituent group; $R_7$ and $R_8$ each independently represents an alkyl group, an alkenyl group, an alkynyl group, an aralkyl group, an aryl group or a heterocyclic group; $R_5$ and $R_6$, $R_5$ and $R_7$, $R_6$ and $R_8$ or $R_7$ and $R_8$ may be connected to each other to form a ring; and r and s may be the same or different.

The cyanine dye cation in the cyanine dye compound for use in the present invention is preferably the cation represented by general formula (II) shown below. Prefereably, $SO_3^-$ groups in general formuola (I) are substituted on at least two groups selected from the group consisting of $R^1$, $R^2$, Za and Zb and particularly preferably substituted on $R^1$ and $R^2$.

(II)

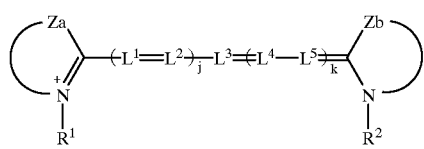

In formula (II), Za and Zb each independently represents an atomic group necessary for completing a 5- or 6-membered nitrogen-containing heterocycle.

$R^1$ and $R^2$ each independently represents an alkyl group or an aryl group.

$L^1$, $L^2$, $L^3$, $L^4$ and $L^5$ each independently represents a substituted or unsubstituted methine group. When substituent groups exist on $L^1$ to $L^5$, they may be connected to each other to form a ring.

j represents 0, 1 or 2, and k represents 0 or 1.

The 5- or 6-membered nitrogen-containing heterocyclic rings (nuclei) formed with Za and Zb include, for example, thiazole, benzothiazole, naphthothiazole, thiazoline, oxazole, benzoxazole, naphthoxazole, oxazoline, selenazole, benzoselenazole, naphthoselenazole, selenazoline, tellurazole, benzotellurazole, naphthotellurazole, tellurazoline, imidazole, benzimidazole, naphthimidazole, pyridine, quinoline, isoquinoline, imidazo[4,5-b]quinoxaline, oxadiazole, thiadiazole, tetrazole and pyrimidine nuclei.

Of these, benzothiazole, imidazole, naphthimidazole, quinoline, isoquinoline, imidazo[4,5-b]quinoxaline, thiadiazole, tetrazole and pyrimidine nuclei are preferred.

A benzene ring or a naphthoquinone ring may be further condensed with each of these rings.

The above-mentioned 5- or 6-membered nitrogen-containing heterocycles may have substituent groups. Preferred examples of the substituent groups (atoms) include halogen atoms, substituted or unsubstituted alkyl groups and aryl groups. Of the halogen atoms, chlorine is preferred. Of the alkyl groups, straight chain alkyl groups having 1 to 6 carbon atoms are preferred. Examples of the substituent groups of the alkyl groups include alkoxyl groups (for example, methoxy) and alkylthio groups (for example, methylthio). Of the aryl groups, phenyl is preferred.

The alkyl groups represented by $R^1$ and $R^2$ described above may have substituent groups, and are straight, cyclic or branched chain alkyl groups each having preferably 1 to 18 carbon atoms (more preferably 1 to 8, and particularly 1 to 6 carbon atoms).

The aryl groups represented by $R^1$ and $R^2$ may have substituent groups, and are preferably aryl groups which may have substituent groups each having 6 to 18 carbon atoms.

Preferred examples of the substituent groups of the alkyl or aryl groups represented by $R^1$ or $R^2$ include substituted or unsubstituted aryl groups each having 6 to 18 carbon atoms (for example, phenyl, chlorophenyl, anisyl, tolyl, 2,4-diamyl and 1-naphthyl); alkenyl groups (for example, vinyl and 2-methylvinyl); alkynyl groups (for example, ethynyl, 2-methylethynyl and 2-phenylethynyl); halogen atoms (for example, F, Cl, Br and I); cyano; hydroxyl; carboxyl; acyl groups (for example, acetyl, benzoyl, salicyloyl and pivaloyl); alkoxyl groups (for example, methoxy, butoxy and cyclohexyloxy); aryloxy groups (for example, phenoxy and 1-naphthoxy); alkylthio groups (for example, methylthio, butylthio, benzylthio and 3-methoxypropylthio); arylthio groups (for example, phenylthio and 4-chlorophenylthio); alkylsulfonyl groups (for example, methanesulfonyl and butanesulfonyl); arylsulfonyl groups (for example, benzenesulfonyl and p-toluenesulfonyl); carbamoyl groups each having 1 to 10 carbon atoms; amido groups each having 1 to 10 carbon atoms; acyloxy groups each having 2 to 10 carbon atoms; alkoxycarbonyl groups each having 2 to 10 carbon atoms; and heterocyclic groups (for example, aromatic heterocyclic groups such as pyridyl, thienyl, furyl, triazolyl, imidazolyl and pyrazolyl, and aliphatic heterocycles such as pyrrolidine, piperidine, morpholine, pyran, thiopyran, dioxane and dithiolane rings.

In the present invention, $R^1$ and $R^2$ described above are each preferably an unsubstituted straight chain alkyl group having 1 to 8 carbon atoms (preferably, 1 to 6 carbon atoms, and particularly 1 to 4 carbon atoms), or a straight chain alkyl group having 1 to 8 carbon atoms (preferably, 1 to 6 carbon atoms, and particularly 1 to 4 carbon atoms) substituted by an alkoxyl group (particularly, methoxy) or an alkylthio group (particularly, methylthio).

The methine groups represented by $L^1$ to $L^5$ may have substituent groups. Preferred examples of the substituent groups include alkyl groups each having 1 to 18 carbon atoms, aralkyl groups and the above-described groups enumerated as the preferred examples of the substituent groups of the alkyl or aryl groups represented by $R^1$ and $R^2$. Of these, alkyl groups (for example, methyl), aryl groups (for example, phenyl), halogen atoms (for example, Cl and Br) and aralkyl groups (for example, benzyl) are preferred.

In the present invention, it is preferred that j and k are each independently 0 or 1.

The substituent groups on $L^1$ to $L^5$ may be connected to each other to form a ring. Preferred examples of the rings are 5- or 6-membered rings, and two or more of these rings may be condensed. The connecting positions vary depending on the number of methine chains formed. For example, when a pentamethine chain is formed by $L^1$ to $L^5$, the preferred connecting positions thereof are $L^1$ and $L^3$, $L^2$ and $L^4$, and $L^3$ and $L^5$. When a double condensed ring is formed, the connecting positions thereof are $L^1$, $L^3$ and $L^5$. In this case, $L^1$ and $R^1$, $L^5$ and $R^2$, and further $L^3$ and $R^2$ may be connected to each other to form a ring, and the ring is preferably a 5- or 6-membered ring.

In the present invention, the ring formed by the substituent groups on $L^1$ to $L^5$ is preferably a cyclohexene ring.

The cyanine dye cation contained in the cyanine dye compound for use in the present invention is preferably the cation represented by the following general formula (IIA):

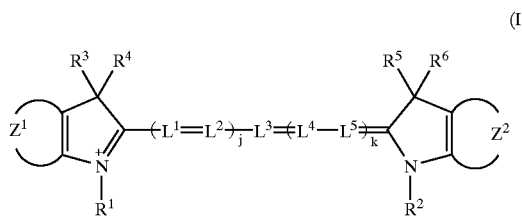

(IIA)

In formula (IIA), $Z^1$ and $Z^2$ each independently represents an atomic group necessary for completing an indolenine nucleus or a benzoindolenine nucleus.

$R^1$ and $R^2$ each independently represents an alkyl group or an aryl group.

$R^3$, $R^4$, $R^5$ and $R^6$ each independently represents an alkyl group.

$L^1$, $L^2$, $L^3$, $L^4$ and $L^5$ each independently represents a substituted or unsubstituted methine group. When substituent groups exist on $L^1$ to $L^5$, they may be connected to each other to form a ring.

j represents 0, 1 or 2, and k represents 0 or 1.

The indolenine or benzoindolenine nuclei represented by $Z^1$ and $Z^2$ may have substituent groups. The substituent groups (atoms) include halogen atoms and aryl groups. Of the halogen atoms, chlorine is preferred. Of the aryl groups, phenyl is preferred.

The alkyl groups represented by $R^3$, $R^4$, $R^5$ and $R^6$ are straight, branched chain or cyclic alkyl groups each having preferably 1 to 18 carbon atoms. Further, $R^3$ and $R^4$, and $R^5$ and $R^6$ may each be connected to form a ring.

The alkyl groups represented by $R^3$, $R^4$, $R^5$ and $R^6$ may have substituent groups. Preferred examples of the substituent groups include the above described groups enumerated as the preferred examples of the substituent groups of the alkyl or aryl groups represented by $R^1$ and $R^2$.

In the present invention, the alkyl groups represented by $R^3$, $R^4$, $R^5$ and $R^6$ are preferably straight chain unsubstituted alkyl groups each having 1 to 6 carbon atoms (particularly, methyl or ethyl).

In general formula (IIA), $R^1$ and $R^2$, $L^1$, $L^2$, $L^3$, $L^4$ and $L^5$, j and k have the same meanings as those defined in general formula (II), respectively. Preferred examples thereof are also the same as described in the above-mentioned general formula (II).

Preferred specific examples of the moiety represented by $[DYE^+]\text{-}(SO_3^-)_{n+1}$ in the compound represented by general formula (I) according to the present invention are shown below:

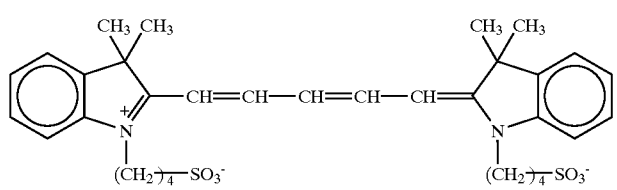

A-1

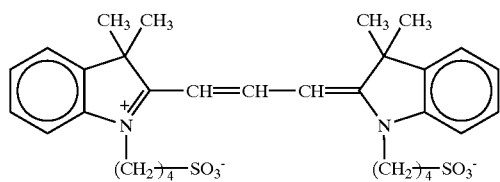

A-2

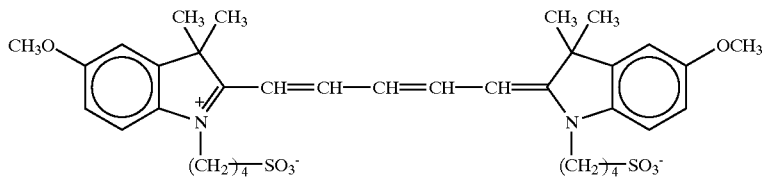

A-3

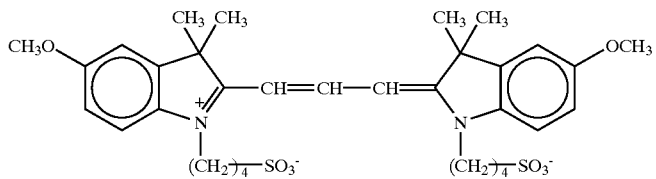

A-4

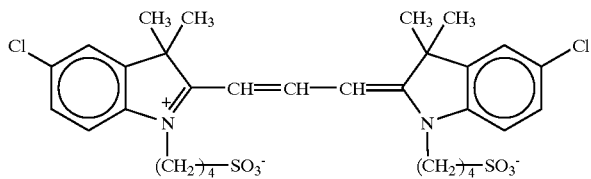

A-5

-continued
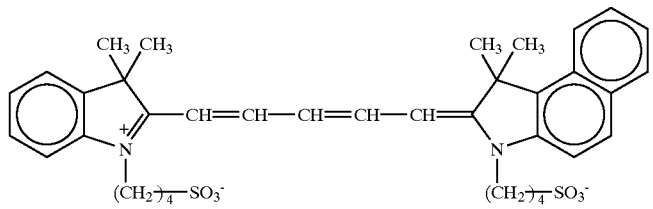
A-6
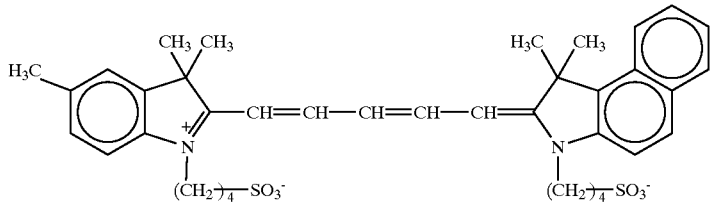
A-7
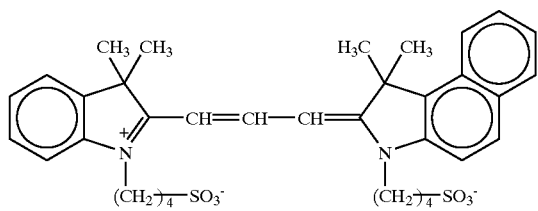
A-8
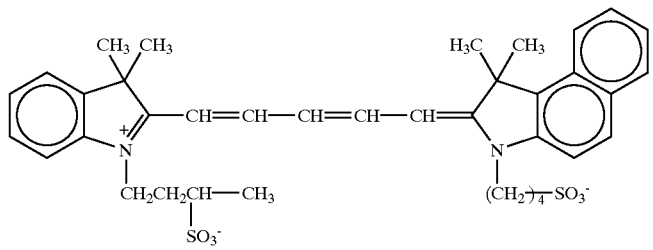
A-9
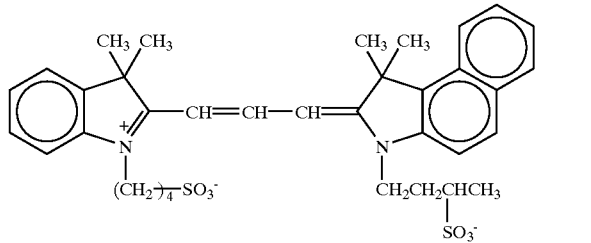
A-10
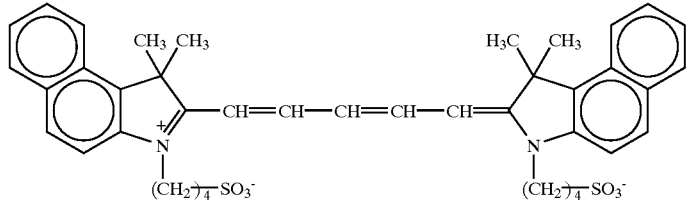
A-11
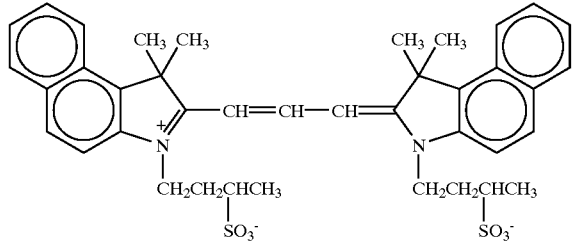
A-12

-continued
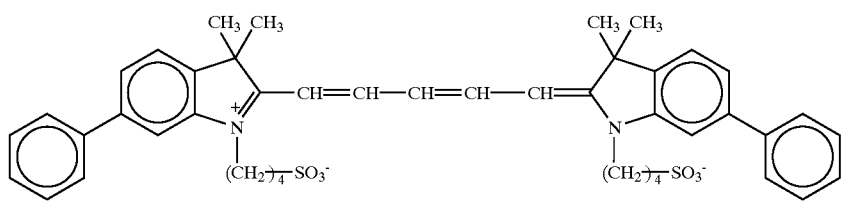
A-13
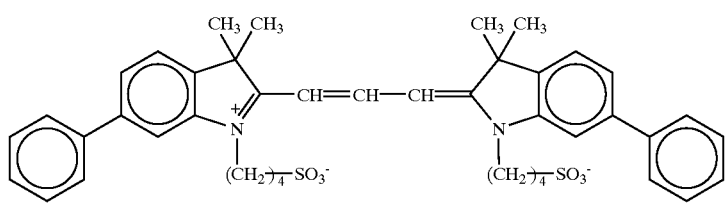
A-14
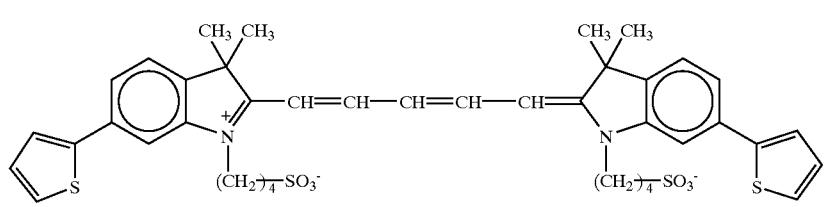
A-15
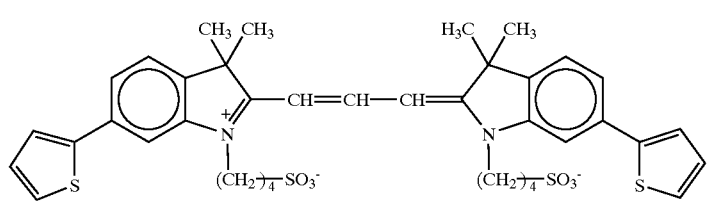
A-16
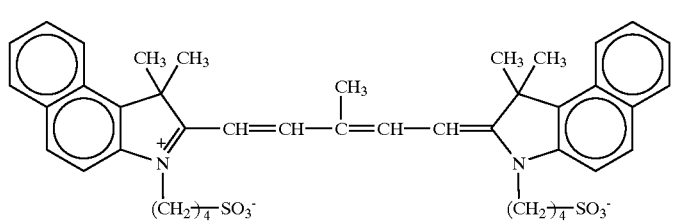
A-17
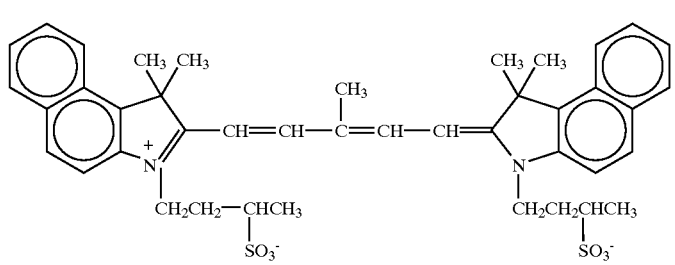
A-18
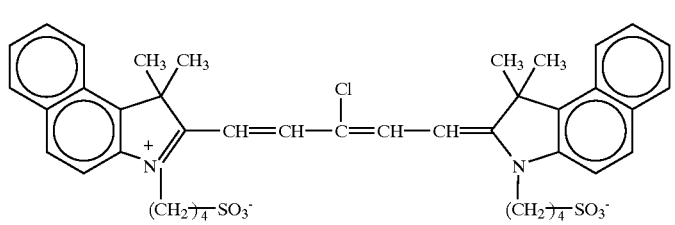
A-19

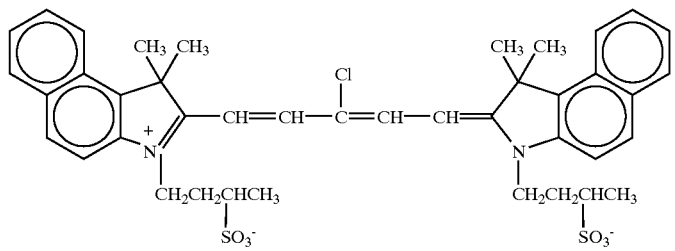
A-20
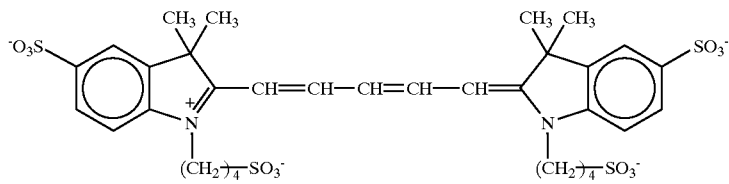
A-21
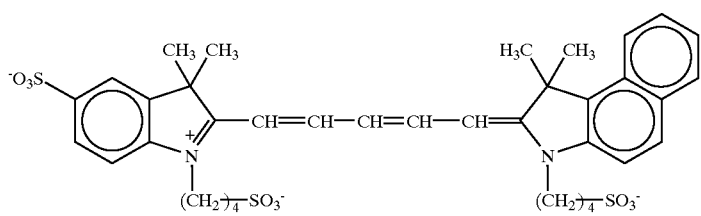
A-22
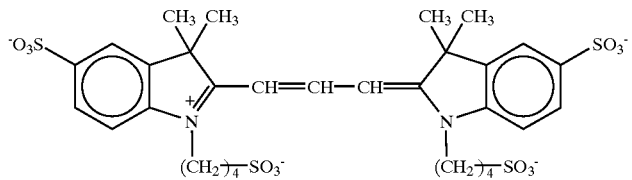
A-23
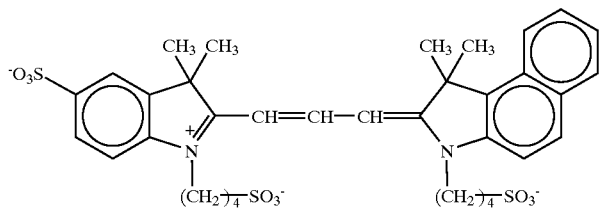
A-24
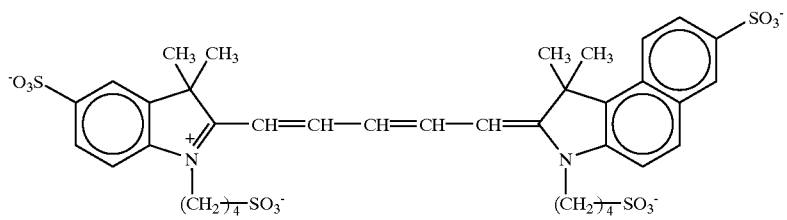
A-25
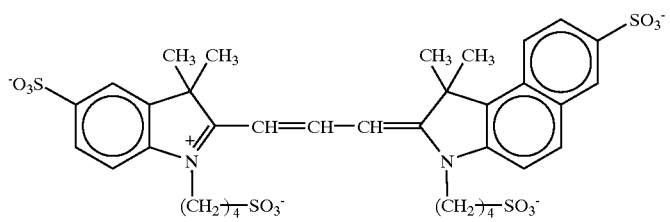
A-26

-continued
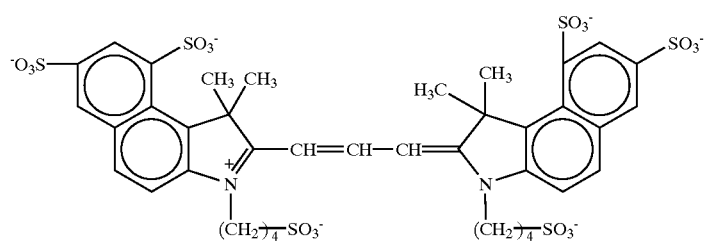
A-27
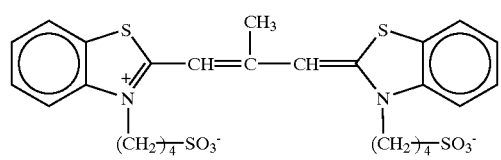
A-28
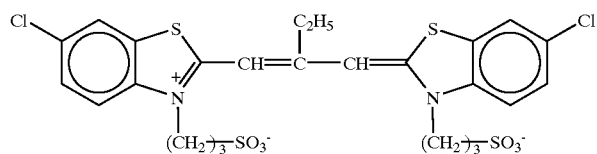
A-29
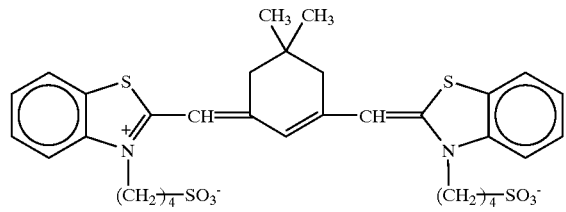
A-30
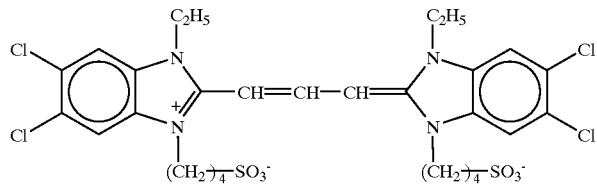
A-31
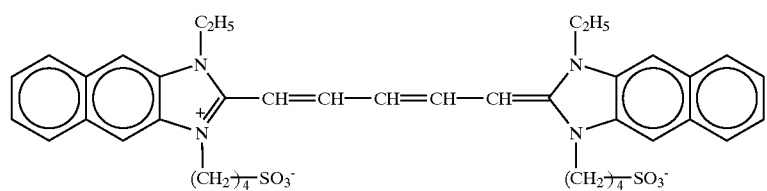
A-32
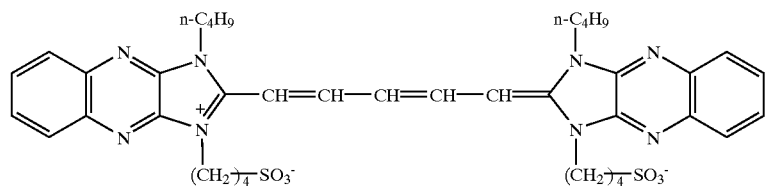
A-33
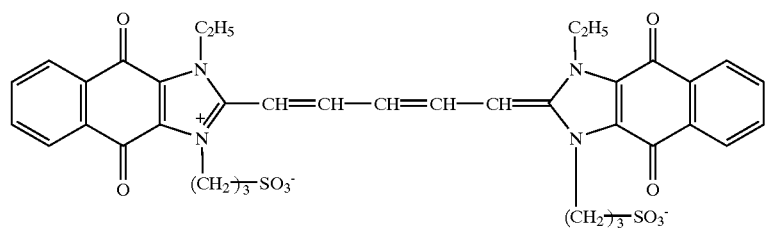
A-34

-continued

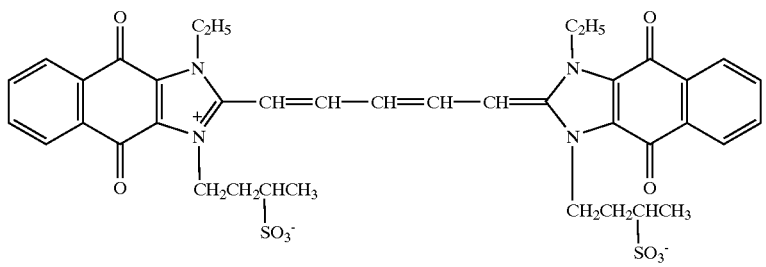

A-35

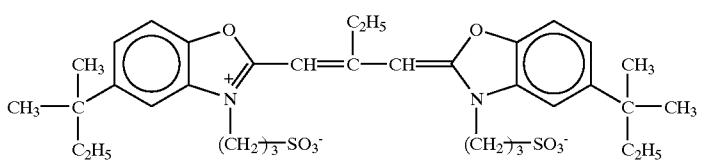

A-36

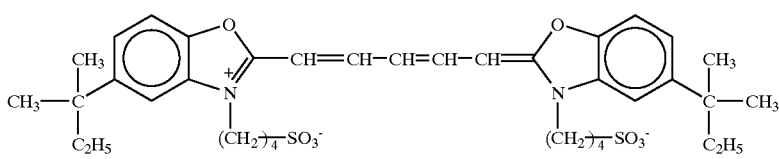

A-37

A-38

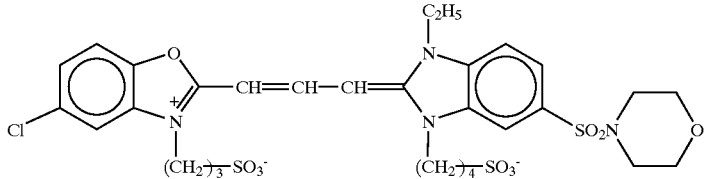

A-39

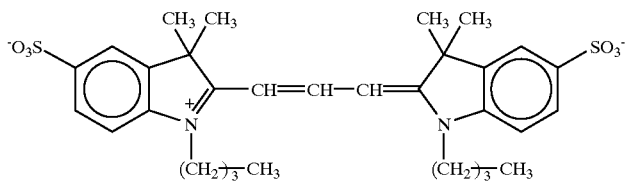

A-40

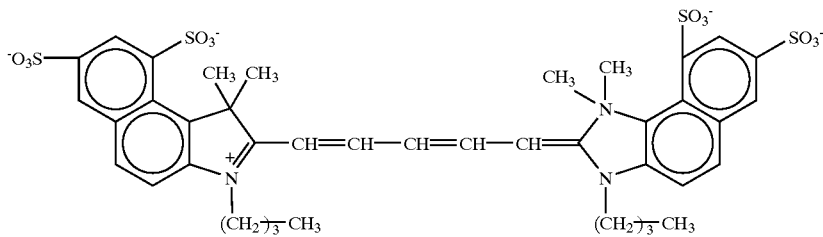

The moiety represented by the following general formula (I-2) in general formula (I) is described in detail below.

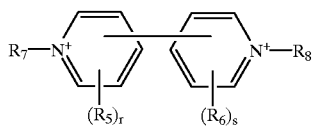

(I-2)

In formula (I-2), $R_5$ and $R_6$ each independently represents a substituent group; $R_7$ and $R_8$ each independently represents an alkyl group, an alkenyl group, an alkynyl group, an aralkyl group, an aryl group or a heterocyclic group; $R_5$ and $R_6$, $R_5$ and $R_7$, $R_6$ and $R_8$ or $R_7$ and $R_8$ may be connected to each other to form a ring; r and s each independently represents an integer of 0 to 4; and when r and s are each 2 or more, a plurality of $R_5$ groups and a plurality of $R_6$ groups each may be the same or different.

The alkyl groups represented by $R_7$ and $R_8$ are preferably substituted or unsubstituted alkyl groups each having 1 to 18 carbon atoms, and more preferably substituted or unsubstituted alkyl groups each having 1 to 8 carbon atoms. These may be straight, branched chain or cyclic alkyl groups. Examples thereof include methyl, ethyl, n-propyl, isopropyl, n-butyl, isobutyl, t-butyl, n-hexyl, neopentyl, cyclohexyl, adamantyl and cyclopropyl.

The substituent groups of the alkyl groups include, for example:

substituted or unsubstituted alkenyl groups each having 2 to 18 carbon atoms (preferably, 2 to 8 carbon atoms) (for example, vinyl);

substituted or unsubstituted alkynyl groups each having 2 to 18 carbon atoms (preferably, 2 to 8 carbon atoms) (for example, ethynyl);

substituted or unsubstituted aryl groups each having 6 to 10 carbon atoms (for example, phenyl and naphthyl);

halogen atoms (for example, F, Cl and Br);

substituted or unsubstituted alkoxyl groups each having 1 to 18 carbon atoms (preferably, 1 to 8 carbon atoms) (for example, methoxy and ethoxy);

substituted or unsubstituted aryloxy groups each having 6 to 10 carbon atoms (for example, phenoxy and p-methoxyphenoxy);

substituted or unsubstituted alkylthio groups each having 1 to 18 carbon atoms (preferably, 1 to 8 carbon atoms) (for example, methylthio and ethylthio);

substituted or unsubstituted arylthio groups each having 6 to 10 carbon atoms (for example, phenylthio);

substituted or unsubstituted acyl groups each having 2 to 18 carbon atoms (preferably, 2 to 8 carbon atoms) (for example, acetyl and propionyl);

substituted or unsubstituted alkylsulfonyl or arylsulfonyl groups each having 1 to 18 carbon atoms (preferably, 1 to 8 carbon atoms) (for example, methanesulfonyl and p-toluenesulfonyl);

substituted or unsubstituted acyloxy groups each having 2 to 18 carbon atoms (preferably, 2 to 8 carbon atoms) (for example, acetoxy and propionyloxy);

substituted or unsubstituted alkoxycarbonyl groups each having 2 to 18 carbon atoms (preferably, 2 to 8 carbon atoms) (for example, methoxycarbonyl and ethoxycarbonyl);

substituted or unsubstituted aryloxycarbonyl groups each having 7 to 11 carbon atoms (for example, naphthoxycarbonyl);

unsubstituted amino groups or substituted amino groups each having 1 to 18 carbon groups (preferably, 1 to 8 carbon atoms) (for example, methylamino, dimethylamino, diethylamino, anilino, methoxyphenylamino, chlorophenylamino, pyridylamino, methoxy-carbonylamino, n-butoxycarbonylamino, phenoxycarbonylamino, methylcarbamoylamino, ethylthiocarbamoylamino, phenyl-carbamoylamino, acetylamino, ethylcarbonylamino, ethylthio-carbamoylamino, cyclohexylcarbonylamino, benzoylamino, chloroacetylamino and methylsulfonylamino);

substituted or unsubstituted carbamoyl groups each having 1 to 18 carbon atoms (preferably, 1 to 8 carbon atoms) (for example, unsubstituted carbamoyl, methylcarbamoyl, ethylcarbamoyl, n-butylcarbamoyl, t-butylcarbamoyl, dimethylcarbamoyl, morpholinocarbamoyl and pyrrolidinocarbamoyl);

unsubstituted sulfamoyl groups or substituted sulfamoyl groups each having 1 to 18 carbon atoms (preferably, 1 to 8 carbon atoms) (for example, methylsulfamoyl and phenylsulfamoyl);

cyano; nitro; carboxyl; hydroxyl; and heterocyclic groups (for example, oxazole, benzoxazole, thiazole, benzothiazole, imidazole, benzimidazole, indolenine, pyridine, piperidine, pyrrolidine, morpholine, sulfolane, furan, thiophene, pyrazole, pyrrole, chroman and coumarin rings).

The alkenyl groups represented by $R_7$ and $R_8$ described above are preferably substituted or unsubstituted alkenyl groups each having 2 to 18 carbon atoms, and more preferably substituted or unsubstituted alkenyl groups each having 2 to 8 carbon atoms. Examples thereof include vinyl, allyl, 1-propenyl and 1,3-butadienyl.

As the substituent groups of the alkenyl groups, those described above as the substituent groups of the alkyl groups are preferred.

The alkynyl groups represented by $R_7$ and $R_8$ are preferably substituted or unsubstituted alkenyl groups each having 2 to 18 carbon atoms, and more preferably substituted or unsubstituted alkenyl groups each having 2 to 8 carbon atoms. Examples thereof include ethynyl and 2-propynyl.

As the substituent groups of the alkynyl groups, those described above as the substituent groups of the alkyl groups are preferred.

The aralkyl groups represented by $R_7$ and $R_8$ are preferably substituted or unsubstituted aralkyl groups each having 7 to 18 carbon atoms, and, for example, benzyl and methylbenzyl are preferred.

The aryl groups represented by $R_7$ and $R_8$ are preferably substituted or unsubstituted aryl groups each having 6 to 18 carbon atoms, and examples thereof include phenyl and naphthyl.

The substituent groups of the aryl groups are preferably those described above as the substituent groups of the alkyl groups. In addition to these, alkyl groups (for example, methyl and ethyl) are also preferred.

The heterocyclic groups represented by $R_7$ and $R_8$ are 5- or 6-membered saturated or unsaturated heterocycles composed of carbon, nitrogen, oxygen or sulfur atoms, and examples thereof include oxazole, benzoxazole, thiazole, benzothiazole, imidazole, benzimidazole, indolenine, pyridine, piperidine, pyrrolidine, morpholine, sulfolane, furan, thiophene, pyrazole, pyrrole, chroman and coumarin rings. The heterocyclic groups may be substituted. In that case, as the heterocyclic groups, those described above as the substituent groups of the alkyl groups are preferred.

The substituent groups represented by $R_5$ and $R_6$ have the same meanings as those defined in the above-mentioned substituent groups of the alkyl groups. They also include alkyl groups (for example, methyl and ethyl), as well as these substituent groups.

In the present invention, the substituent groups represented by $R_5$ and $R_6$ are each preferably a hydrogen atom or an alkyl group, and a hydrogen atom is particularly preferred.

It is particularly preferred that the moiety structure represented by general formula (I-2) is represented by the following general formula (I-3) or (I-4):

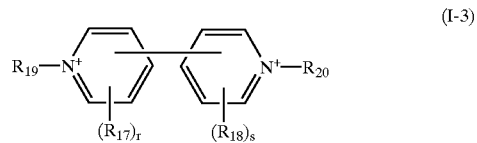

(I-3)

wherein $R_{17}$ and $R_{18}$ have the same meanings as the substituent groups represented by $R_5$ and $R_6$ described above, respectively, and the preferred ranges thereof are also the same for the respective substituent groups; $R_{19}$ and $R_{20}$ have the same meanings as the substituent groups represented by $R_7$ and $R_8$ described above, respectively, and the preferred ranges thereof are also the same for the respective substituent groups; r and s each independently represents an integer of 0 to 4; and when r and s are each 2 or more, a plurality of $R_{17}$ groups and a plurality of $R_{18}$ groups may be the same or different;

(I-4)

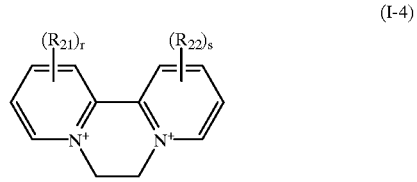

wherein $R_{21}$ and $R_{22}$ have the same meanings as the substituent groups represented by $R_5$ and $R_6$ described above, respectively, and the preferred ranges thereof are also the same for the respective substituent groups; $R_{21}$ and $R_{22}$ are preferably connected to each other to form a carbon ring or a heterocycle, and a condensed aromatic ring of pyridine rings to which $R_{21}$ and $R_{22}$ are each connected is particularly preferred; r and s each independently represents an integer of 0 to 4; and when r and s are each 2 or more, a plurality of $R_{21}$ groups and a plurality of $R_{22}$ groups may be the same or different.

Specific examples of the moiety represented by general formula (I-2) in the dye compound represented by general formula (I) for use in the present invention are shown below with Example Nos. "B-":

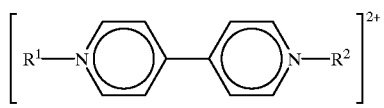

| No. | $R^1$ | $R^2$ |
|---|---|---|
| B-1 | $CH_3$ | $CH_3$ |
| B-2 | $C_2H_5$ | $C_2H_5$ |
| B-3 | $n-C_3H_7$ | $n-C_3H_7$ |
| B-4 | $n-C_4H_9$ | $n-C_4H_9$ |
| B-5 | iso-$C_4H_9$ | iso-$C_4H_9$ |
| B-6 | $n-C_8H_{13}$ | $n-C_8H_{13}$ |
| B-7 | —$C(CH_3)_3$ | —$C(CH_3)_3$ |
| B-8 | —$CH_2CH_2C(CH_3)_3$ | —$CH_2CH_2C(CH_3)_3$ |
| B-9 | $CH_2$=CH | $CH_2$=CH |
| B-10 | $NCCH_2$ | $NCCH_2$ |
| B-11 | $EtO_2C$—$CH_2$ | $EtO_2C$—$CH_2$ |
| B-12 | $HOCH_2CH_2$ | $HOCH_2CH_2$ |
| B-13 | $EtOCH_2CH_2$ | $EtOCH_2CH_2$ |
| B-14 | cyclohexyl | cyclohexyl |
| B-15 | $CH_3$ | $PhCH_2$ |
| B-16 | $CH_3COCH_2$ | $CH_3COCH_2$ |
| B-17 | adamantyl | adamantyl |
| B-18 | $CF_3CH_2$ | $CF_3CH_2$ |
| B-19 | Ph | Ph |
| B-20 | $CH_3$-C6H4- | $CH_3$-C6H4- |
| B-21 | $CH_3O$-C6H4- | $CH_3O$-C6H4- |
| B-22 | F-C6H4- | F-C6H4- |

-continued
B-23 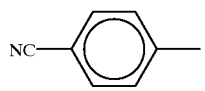 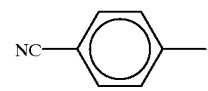
B-24 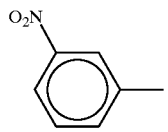 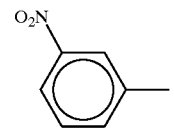
B-25 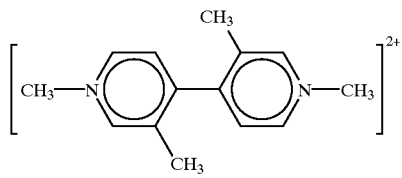
B-26 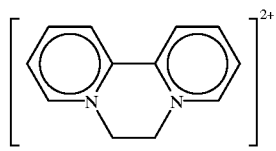
B-27 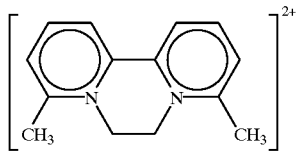
B 28 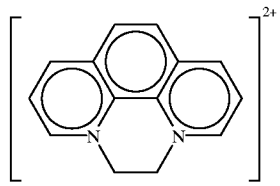
B-29 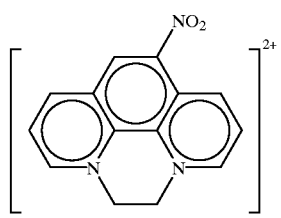
B-30 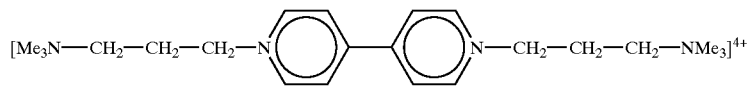
B-31 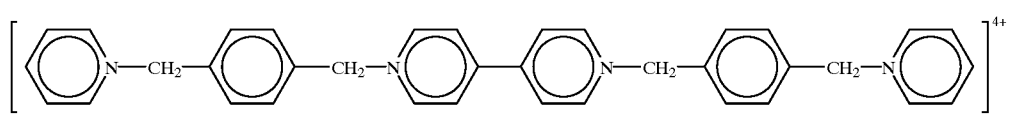

-continued
B-32
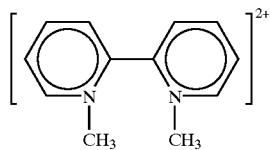
B-33
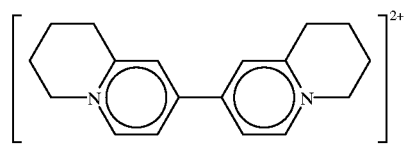
B-34
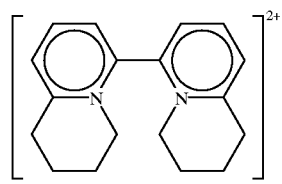
B-35
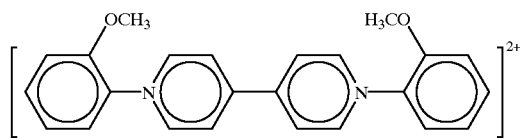
B-36
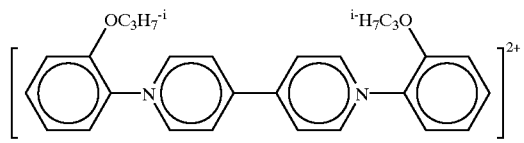
B-37
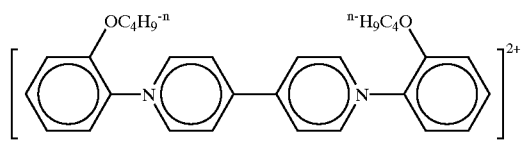
B-38
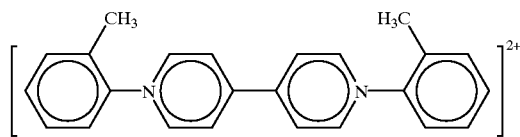
B-39
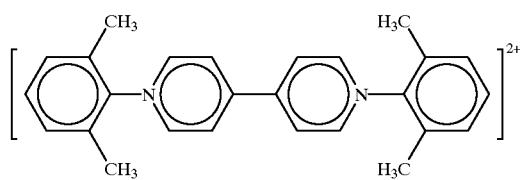

-continued
B-40
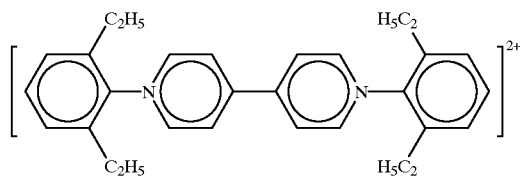
B-41
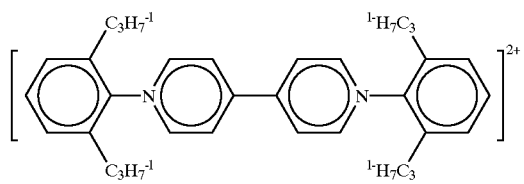
B-42
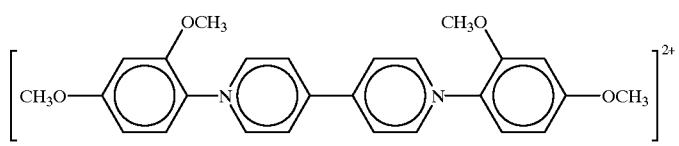
B-43
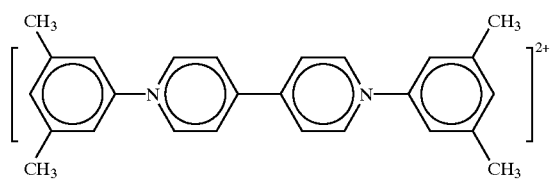
B-44
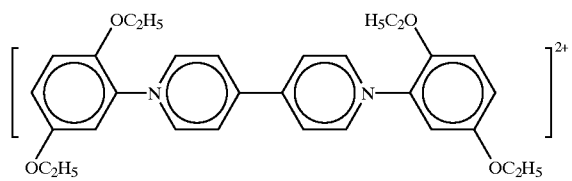
B-45
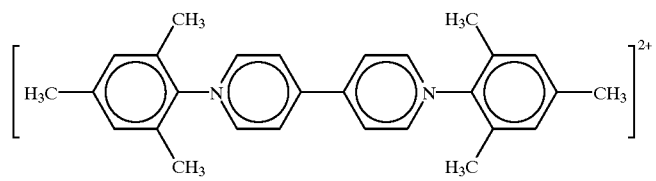
B-46
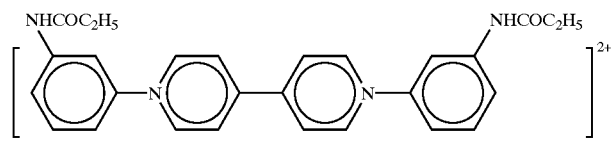

-continued
B-47
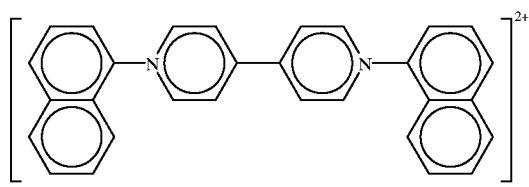
B-48
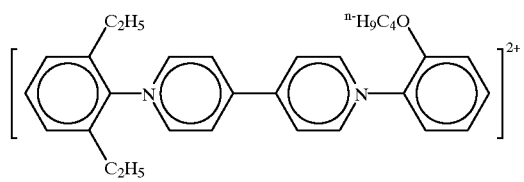
B-49
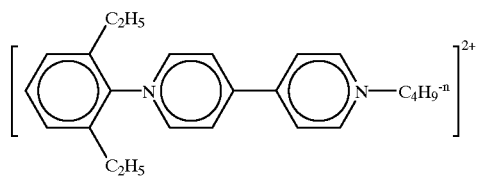
B-50
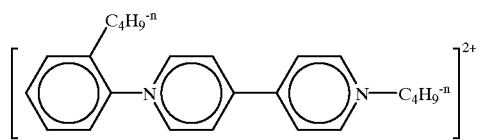
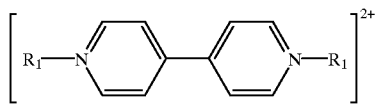
| No. | $R_1$ |
|---|---|
| B-51 | iso-$C_5H_{11}$ |
| B 52 | $CH_3CH_2CH_2CHCH_2$<br>$\quad\quad\quad\quad\quad\;\;|$<br>$\quad\quad\quad\quad\quad C_2H_5$ |
| B-53 | 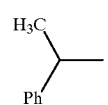 |
| B-54 | $PhCH_2CH_2$ |
| B-55 | 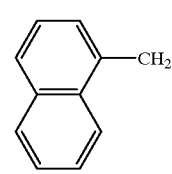 |

-continued
| | |
|---|---|
| B-56 | 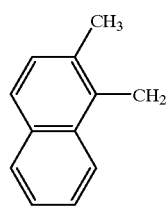 |
| B-57 | 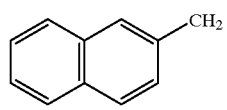 |
| B-58 | 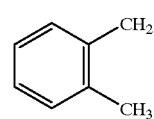 |
| B-59 | 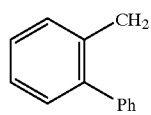 |
| B-60 | $CH_2{=}CH{-}CH_2$ |
| B-61 | 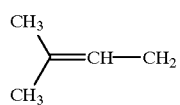 |
| B-62 | 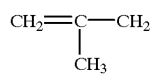 |
| B-63 | $Ph_3C$ |
| B-64 | 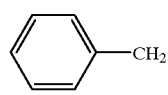 |
| B-65 | $CH{\equiv}C{-}CH_2$ |
| B-66 | $CH_3SO_2CH_2CH_2$ |
| B-67 | 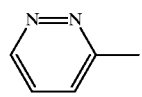 |
| B-68 | 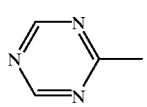 |

-continued

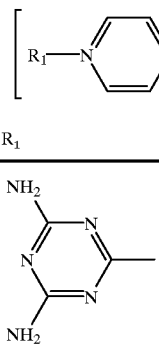

| No. | R₁ | R₂ |
|---|---|---|
| B-69 | 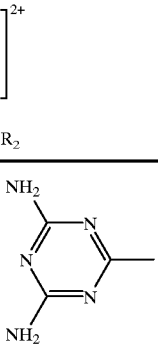 | 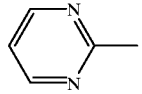 |
| B-70 | 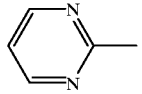 | 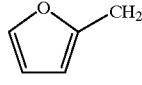 |
| B-71 | 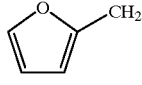 | 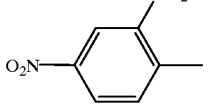 |
| B-72 | 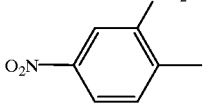 | 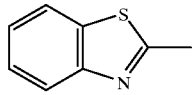 |
| B-73 | 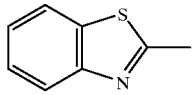 | 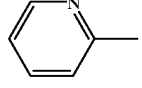 |
| B-74 | 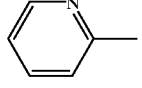 | |
| B-75 | iso-$C_4H_9$ | $PhCH_2$ |

Preferred specific examples of the compound for use in the present invention are shown in Table 1 given below.

TABLE 1

| Compound No. | $[DYE^+]\text{-}(SO_3^-)_{n+1}$ | Moiety Corresponding to General Formula (I-2) |
|---|---|---|
| 1 | A-1 | B-5 |
| 2 | ditto | B-40 |
| 3 | ditto | B-54 |
| 4 | A-2 | B-5 |
| 5 | ditto | B-40 |
| 6 | ditto | B-54 |
| 7 | A-3 | B-5 |
| 8 | ditto | B-40 |
| 9 | ditto | B-74 |
| 10 | A-4 | B-5 |
| 11 | ditto | B-74 |
| 12 | ditto | B-54 |
| 13 | A-5 | B-5 |
| 14 | ditto | B-40 |
| 15 | ditto | B-74 |
| 16 | A-6 | B-5 |
| 17 | ditto | B-40 |
| 18 | ditto | B-54 |
| 19 | A-8 | B-5 |
| 20 | ditto | B-40 |
| 21 | A-10 | B-40 |
| 22 | ditto | B-54 |
| 23 | A-12 | B-5 |
| 24 | ditto | B-40 |
| 25 | ditto | B-74 |
| 26 | A-14 | B-40 |
| 27 | ditto | B-54 |
| 28 | A-16 | B-74 |
| 29 | ditto | B-54 |
| 30 | A-17 | B-5 |
| 31 | ditto | B-40 |
| 32 | A-18 | B-40 |
| 33 | ditto | B-54 |
| 34 | A-19 | B-40 |
| 35 | ditto | B-54 |
| 36 | A-24 | B-40 |
| 37 | ditto | B-74 |
| 38 | A-26 | B-40 |

TABLE 1-continued

| Compound No. | [DYE⁺]-(SO₃⁻)ₙ₊₁ | Moiety Corresponding to General Formula (I-2) |
|---|---|---|
| 39 | ditto | B-70 |
| 40 | A-28 | B-5 |
| 41 | ditto | B-54 |
| 42 | A-29 | B-40 |
| 43 | ditto | B-54 |
| 44 | A-30 | B-5 |
| 45 | ditto | B-74 |
| 46 | A-31 | B-40 |
| 47 | ditto | B-74 |
| 48 | A-33 | B-40 |
| 49 | ditto | B-54 |
| 50 | ditto | B-74 |

In Table 1, the compounds are constituted by combining the anion moieties represented by $[DYE^+]\text{-}(SO_3^-)_{n+1}$ with the cation moieties represented by general formula (I-2). For example, this is explained below with reference to compound No. 1. For compound No. 1 (anion moiety (A-1)/cation moiety (B-5)), the anion moiety and cation moiety are represented by the following formulas, respectively.

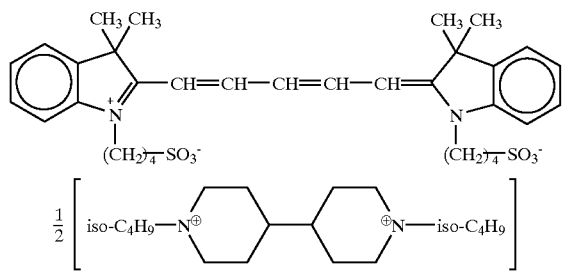

The same explanation can be applied to the other exemplified compounds in Table 1. The compounds represented by the above-mentioned general formula (I) according to the present invention may be used either alone or as a combination of two or more of them. The compounds represented by general formula (I) according to the present invention can be easily synthesized with reference to descriptions of known literatures.

Examples of the literature include, for example, F. M. Hamer, *The Cyanine Dyes and Related Compounds* 5, infra p. 55, Interscience Publishers, N.Y. (1964); Nikolai Tyutyulkov, Jurgen Fabian, Achim Ulehlhorn, Fritz Dietz and Alia Tadjer, *Polymethine Dyes*, pages 23 to 38, St. Kliment Ohridski University Press, Sophia; D. M. Sturmer, *Heterocyclic Compounds-Special Topics in Heterocyclic Chemistry*, chapter 18, clause 14, pages 482 to 515, John Wiley & Sons, New York, London (1977); *Rodd's Chemistry of Carbon Compounds*, 2nd Ed., vol. IV, part B, chapter 15, pages 369 to 422, Elsvier Science Public Company Inc., New York (1977); and ibid., 2nd Ed., vol. IV, part B, chapter 15, pages 267 to 296 (1985).

More specifically, a salt represented by $[DYE^+]\text{-}(SO_3^-)_{n+1}(M^+)_n$ (wherein $M^+$ represents a cation such as a sodium ion, a potassium ion, an ammonium ion, a pyridinium ion, a triethylammonium ion or an N-ethylpyridinium ion) and a salt formed by combining the cation represented by general formula (I-2) with an anion such as Cl⁻, Br⁻, I⁻ or a p-toluenesulfonate are mixed with each other in an appropriate solvent, for example, in methanol, water or a mixture thereof, followed by precipitation as crystals to obtain the compound represented by general formula (I).

As one example thereof, compound No. 41 is obtained as a brown powder having a melting point of 213° C. to 217° C. by mixing a solution of an N-ethylpyridinium salt (A-28) in methanol with a solution of a bromide (B-54) in methanol, precipitating crystals, collecting the resulting crystals by filtration, and washing them with methanol, followed by drying.

In another aspect, the cyanine dye compound for use in the present invention is preferably represented by the following general formula (III):

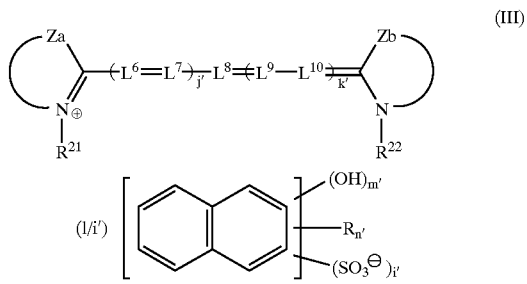

wherein $Z^a$ and $Z^b$ each independently represents an atomic group necessary for completing a 5- or 6-membered nitrogen-containing heterocycle; $R^{21}$ and $R^{22}$ each independently represents a substituted or unsubstituted alkyl group or a substituted or unsubstituted aryl group; $L^6$, $L^7$, $L^8$, $L^9$ and $L^{10}$ each independently represents a substituted or unsubstituted methine group, with the proviso that when substituent groups exist on $L^6$ to $L^{10}$, they may be connected to each other to form a ring; R represents a substituent group; i' represents an integer of from 2 to 7; j' represents 0, 1 or 2; k' represents 0 or 1; m' represents an integer of from 1 to 4; n' represents an integer of 0 to 7; m'+n'+i' is 8 or less; when n' is 2 or more, a plurality of R groups may be the same or different; and when m'=i'=2, two hydroxyl groups are not each concurrently substituted at the 1- and 8-positions.

The 5- or 6-membered nitrogen-containing heterocyclic rings (nuclei) represented by $Z^a$ and $Z^b$ include, for example, thiazole, benzothiazole, naphthothiazole, thiazoline, oxazole, benzoxazole, naphthoxazole, oxazoline, selenazole, benzoselenazole, naphthoselenazole, selenazoline, tellurazole, benzotellurazole, naphthotellurazole, tellurazoline, imidazole, benzimidazole, naphthimidazole, pyridine, quinoline, isoquinoline, imidazo[4,5-b]quinoxaline, oxadiazole, thiadiazole, tetrazole and pyrimidine nuclei. Of these, the benzothiazole, imidazole, naphthimidazole, quinoline, isoquinoline, imidazo[4,5-b]quinoxaline, thiadiazole, tetrazole and pyrimidine nuclei are preferred. A benzene ring or a naphthoquinone ring may be further condensed with each of these rings The above-mentioned 5- or 6-membered nitrogen-containing heterocycles may have substituent groups. Preferred examples of the substituent groups (atoms) include halogen atoms, substituted or unsubstituted alkyl groups and aryl groups. Of the halogen atoms, chlorine is preferred. Of the alkyl groups, straight chain alkyl groups each having 1 to 6 carbon atoms are preferred. Examples of the substituent groups of the alkyl groups include alkoxyl groups (for example, methoxy) and alkylthio groups (for example, methylthio). Of the aryl groups, phenyl is preferred.

The alkyl groups represented by $R^{21}$ and $R^{22}$ may have substituent groups, and are straight, cyclic or branched chain alkyl groups each having preferably 1 to 18 carbon atoms (more preferably 1 to 8, and particularly 1 to 6 carbon atoms). The aryl groups represented by $R^{21}$ and $R^{22}$ may have substituent groups, and are preferably aryl groups which may have substituent groups each having a total number of carbon atoms of 6 to 18.

Preferred examples of the substituent groups of the alkyl or aryl groups represented by $R^{21}$ or $R^{22}$ include substituted or unsubstituted aryl groups each having 6 to 18 carbon atoms (for example, phenyl, chlorophenyl, anisyl, tolyl, 2,4-di-t-amyl and 1-naphthyl); alkenyl groups (for example, vinyl and 2-methylvinyl); alkynyl groups (for example, ethynyl, 2-methylethynyl and 2-phenylethynyl); halogen atoms (for example, F, Cl, Br and I); cyano; hydroxyl; carboxyl; acyl groups (for example, acetyl, benzoyl, salicyloyl and pivaloyl); alkoxyl groups (for example, methoxy, butoxy and cyclohexyloxy); aryloxy groups (for example, phenoxy and 1-naphthoxy); alkylthio groups (for example, methylthio, butylthio, benzylthio and 3-methoxypropylthio); arylthio groups (for example, phenylthio and 4-chlorophenylthio); alkylsulfonyl groups (for example, methanesulfonyl and butanesulfonyl); arylsulfonyl groups (for example, benzenesulfonyl and p-toluenesulfonyl): carbamoyl groups each having 1 to 10 carbon atoms; amido groups each having 1 to 10 carbon atoms; acyloxy groups each having 2 to 10 carbon atoms; alkoxycarbonyl groups each having 2 to 10 carbon atoms; and heterocyclic groups (for example, aromatic heterocyclic groups such as pyridyl, thienyl, furyl, triazolyl, imidazolyl and pyrazolyl, and aliphatic heterocycles such as pyrrolidine, piperidine, morpholine, pyran, thiopyran, dioxane and dithiolane rings.

In the present invention, $R^{21}$ and $R^{22}$ are each preferably an unsubstituted straight chain alkyl group having 1 to 8 carbon atoms (preferably 1 to 6 carbon atoms, and particularly 1 to 4 carbon atoms), or a straight chain alkyl group having 1 to 8 carbon atoms (preferably, 1 to 6 carbon atoms, and particularly 1 to 4 carbon atoms) substituted by an alkoxyl group (particularly, methoxy) or an alkylthio group (particularly, methylthio).

The methine groups represented by $L^6$ to $L^{10}$ may have substituent groups. Preferred examples of the substituent groups include alkyl groups each having 1 to 18 carbon atoms, aralkyl groups and groups described as the preferred examples of the substituent groups of the alkyl or aryl groups represented by $R^{21}$ and $R^{22}$ described above. Of these, the alkyl groups (for example, methyl), the aryl groups (for example, phenyl), the halogen atoms (for example, Cl and Br) and the aralkyl groups (for example, benzyl) are preferred. In the present invention, it is preferred that j' and k' are each independently 0 or 1. In particular, j'+k' is preferably 1 or 2.

The substituent groups on $L^6$ to $L^{10}$ may be connected to each other to form a ring. Preferred examples of the rings are 5- or 6-membered rings, and two or more of these rings may be condensed. The connecting positions vary depending on the number of methine chains formed. For example, when a pentamethine chain is formed by $L^6$ to $L_{10}$, the preferred connecting positions thereof are $L^6$ and $L^8$, $L^7$ and $L^9$, and $L^8$ and $L^{10}$. When a double condensed ring is formed, the connecting positions thereof are $L^6$, $L^8$ and $L^{10}$. In this case, $L^6$ and $R^{21}$, $L^{10}$ and $R^{22}$, and further $L^8$ and $R^{22}$ may be connected to each other to form a ring, and the ring is preferably a 5- or 6-membered ring. In the present invention, the ring formed by the substituent groups on $L^6$ to $L^{10}$ is preferably a cyclohexene ring. In general formula (III), i' is preferably 2 or 3, and m' is preferably 1 or 2 and most preferably 2. When m' is 2, the substitution positions are preferably the 2 and 7-positions.

It is further preferred that the cyanine dye compound for use in this aspect is a compound represented by the following general formula (IV):

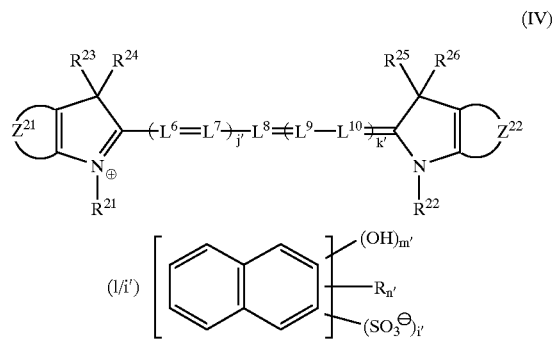

(IV)

wherein $Z^{21}$ and $Z^{22}$ each independently represents an atomic group necessary for completing an indolenine nucleus or a benzoindolenine nucleus; $R^{21}$ and $R^{22}$ each independently represents a substituted or unsubstituted alkyl group or a substituted or unsubstituted aryl group; $R^{23}$, $R^{24}$, $R^{25}$ and $R^{26}$ each independently represents an alkyl group; and $L^6$, $L^7$, $L^8$, $L^9$, $L_{10}$, R, i', j', k', m' and n' have the same meanings as defined for general formula (III), respectively.

The indolenine or benzoindolenine nuclei represented by $Z^{21}$ and $Z^{22}$ described above may have substituent groups. The substituent groups (atoms) include halogen atoms and aryl groups. Of the halogen atoms, chlorine is preferred. Of the aryl groups, phenyl is preferred.

The alkyl groups represented by $R^{23}$, $R^{24}$, $R^{25}$ and $R^{26}$ described above are preferably straight, branched chain or cyclic alkyl groups each having 1 to 18 carbon atoms. Further, $R^{23}$ and $R^{24}$, and $R^{25}$ and $R^{26}$ may each be connected to form a ring. The alkyl groups represented by $R^{23}$, $R^{24}$, $R^{25}$ and $R^{26}$ may have substituent groups. Preferred examples of the substituent groups include groups described as the preferred examples of the substituent groups of the alkyl or aryl groups represented by $R^{21}$ and $R^{22}$ described above. In the present invention, the alkyl groups represented by $R^{23}$, $R^{24}$, $R^{25}$ and $R^{26}$ are preferably straight chain unsubstituted alkyl groups each having 1 to 6 carbon atoms (particularly, methyl or ethyl).

In general formula (IV), $R^{21}$ and $R^{22}$, $L^6$, $L^7$, $L^8$, $L^9$ and $L^{10}$, i', j' and k' have the same meanings as those defined for general formula (III), respectively. Preferred examples thereof are also the same as described for the above-mentioned general formula (III).

The cyanine dye compound for use in this aspect of the present invention is particularly preferably a compound represented by the following formula (V):

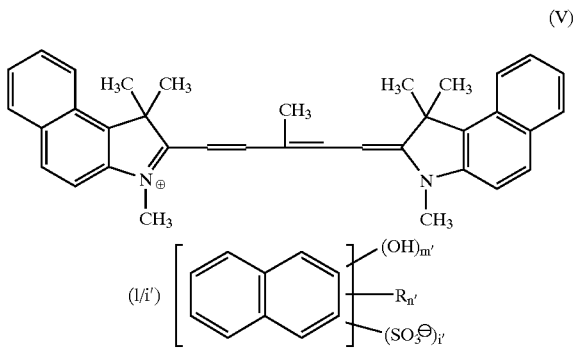

(V)

wherein R, i', m' and n' have the same meanings as defined for formula (III), respectively. Preferred examples thereof are also the same as described for the above-mentioned general formula (III).

Alternatively, the cyanine compound for use in this aspect of the present invention is particularly preferably a compound represented by the following formula (VI):

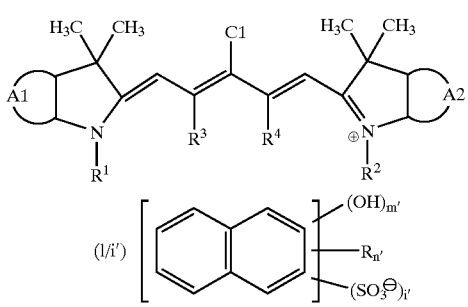

wherein A1 and A2 each independently represents a naphthalene condensed ring; $R^1$ and $R^2$ each independently represents a n alkyl group, $R^3$ and $R^4$ each independently represents a hydrogen atom or an alkyl group which may have a substituent, provided that $R^3$ and $R^4$ may be connected to each other to form a ring, and R, i', m' and n' have the same meaning as defined for formula (III), respectively.

The cyanine dye compound for use in the recording medium of the present invention is described in detail below.

In formula (VI), the naphthalene condensed ring represented by A1 and A2 each may be condensed at either one of 1,2-position and 2,3-position but is preferably condensed at the 1,2-position.

In formula (VI), the alkyl group represented by $R^1$, $R^2$, $R^3$ and $R^4$ is preferably an alkyl group having from 1 to 18 carbon atoms, more preferably an alkyl group having from 1 to 4 carbon atoms, and still more preferably a methyl group.

In formula (VI), $R^3$ and $R^4$ may be connected to each other to form a ring and the ring is preferably a 5-, 6- or 7-membered ring, more preferably a 5- or 6-membered ring, and still more preferably a 6-membered ring.

In formula (VI), $R^3$ and $R^4$ each represents a hydrogen atom or an alkyl group, preferably a hydrogen atom.

In formula (VI), A1, A2, $R^1$, $R^2$, $R^3$ and $R^4$ each may have a substituent and examples of the substituent include a linear or cyclic alkyl group having from 1 to 20 carbon atoms (e.g., methyl, ethyl, n-propyl, isopropyl, n-butyl), a substituted or unsubstituted aryl group having from 6 to 18 carbon atoms (e.g., phenyl, chlorophenyl, anisyl, toluyl, 2,4-di-tert-amyl, 1-naphthyl), an alkenyl group (e.g., vinyl, 2-methylvinyl), an alkynyl group (e.g., ethynyl, 2-methylethynyl, 2-phenylethynyl), a halogen atom (e.g., F, Cl, Br, I), a cyano group, a hydroxyl group, a carboxyl group, an acyl group (e.g., acetyl, benzoyl, salicyloyl, pivaloyl), an alkoxy group (e.g., methoxy, butoxy, cyclohexyloxy), an aryloxy group (e.g., phenoxy, 1-naphthoxy), an alkylthio group (e.g., methylthio, butylthio, benzylthio, 3-methoxypropylthio), an arylthio group (e.g., phenylthio, 4-chlorophenylthio), an alkylsulfonyl group (e.g., methanesulfonyl, butanesulfonyl), an arylsulfonyl group (e.g., benzenesulfonyl, paratoluenesulfonyl), a carbamoyl group having from 1 to 10 carbon atoms, an amido group having from 1 to 10 carbon atoms, an amido group having from 2 to 12 carbon atoms, an acyloxy group having from 2 to 10 carbon atoms, an alkoxycarbonyl group having from 2 to 10 carbon atoms, a heterocyclic group (for example, aromatic heterocyclic ring such as pyridyl, thienyl, furyl, thiazolyl, imidazolyl and pyrazolyl, and aliphatic heterocyclic ring such as pyrrolidine, piperidine, morpholine, pyrane, thiopyrane, dioxane and dithiolane).

Among these substituents, preferred are an alkyl group having from 1 to 6 carbon atoms (particularly methyl), an aryl group having from 6 to 10 carbon atoms (particularly phenyl), an alkoxy group having from 1 to 10 carbon atoms (particularly methoxy), a hydroxyl group and a halogen atom (particularly chlorine), and more preferred are a methyl group, a phenyl group, a hydroxyl group and a chlorine atom.

Preferred specific examples of the compounds represented by formula (III), (IV), (V) or (VI) according to this aspect of the invention are shown below.

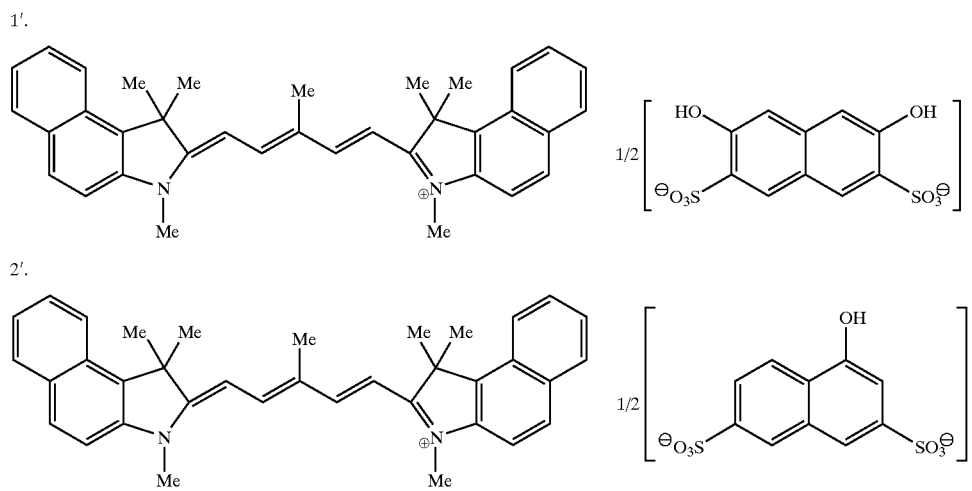

3'. 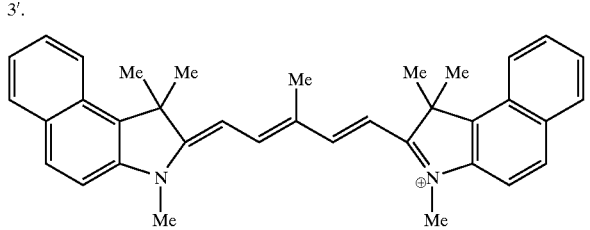 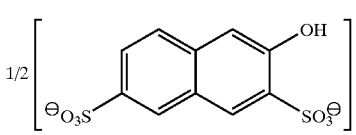
4'. 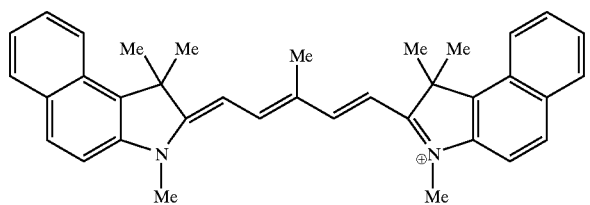 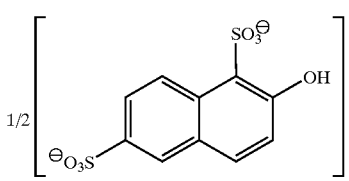
5'. 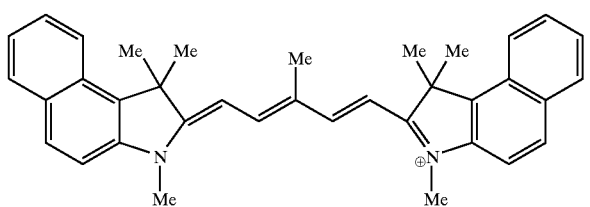 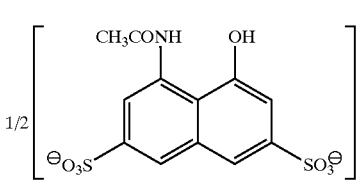
6'. 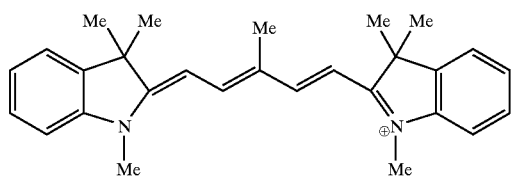 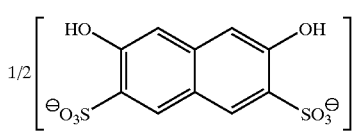
7'. 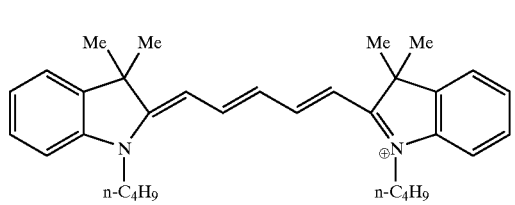 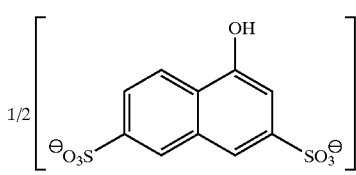
8'. 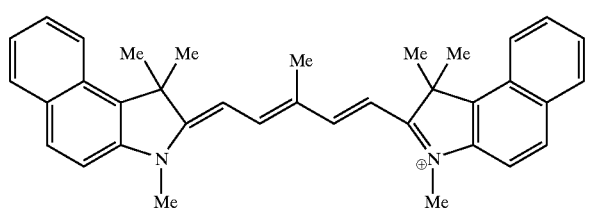 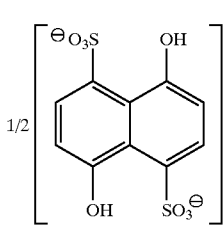
9'. 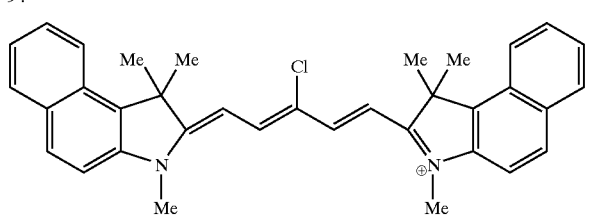 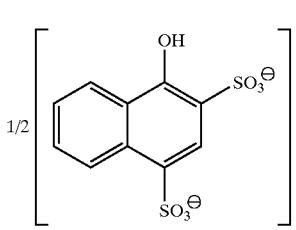

-continued
10'.
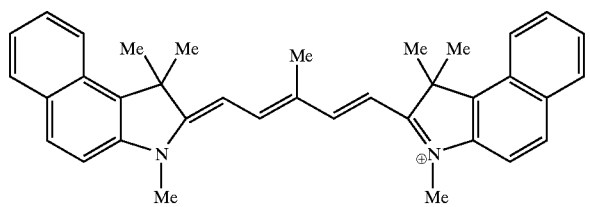 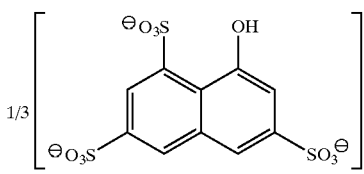
11'.
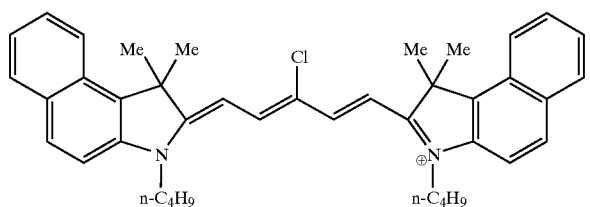 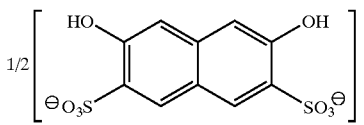
12'.
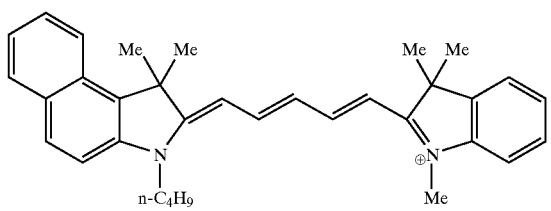 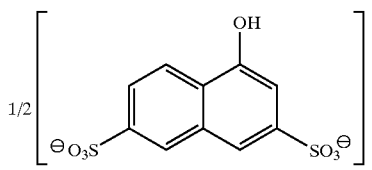
13'.
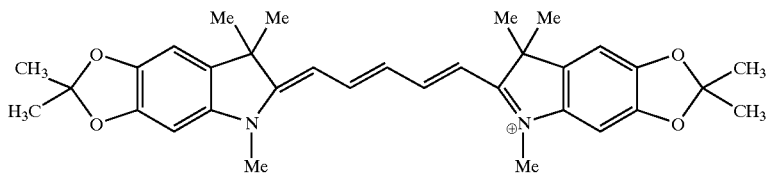 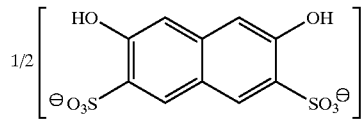
14'.
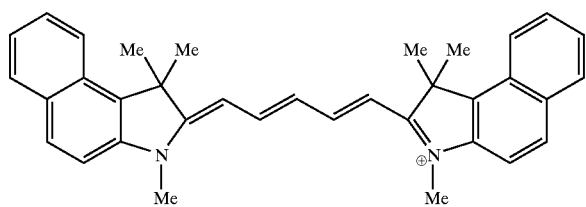 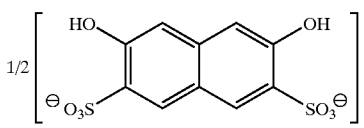
15'.
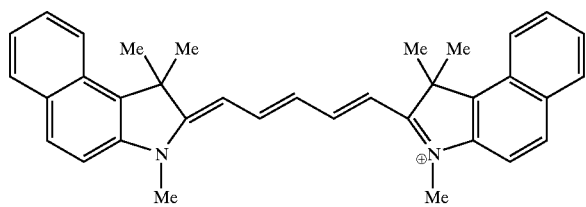 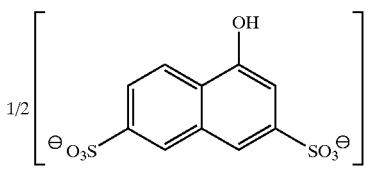
16'.
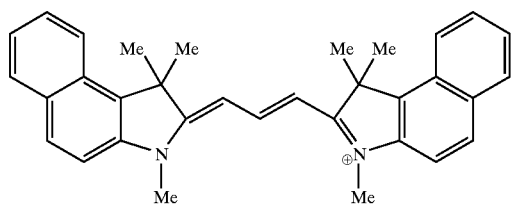 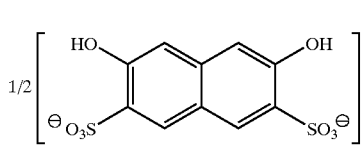

-continued
17'.
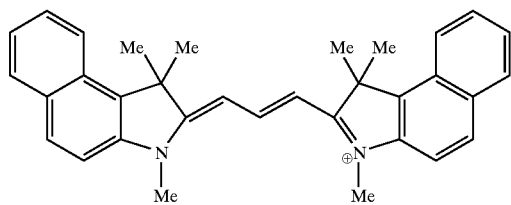 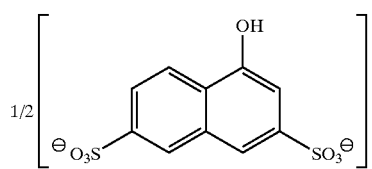
18'.
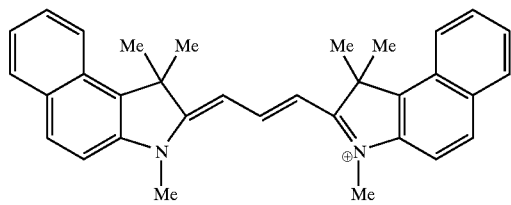 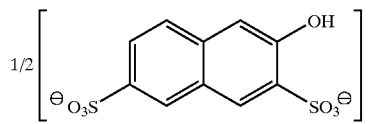
19'.
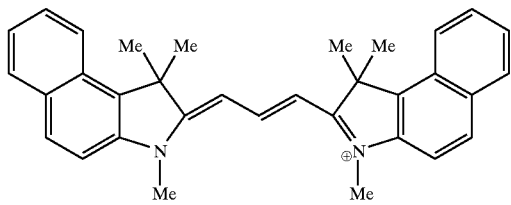 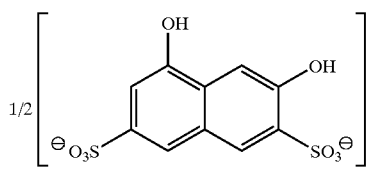
20'.
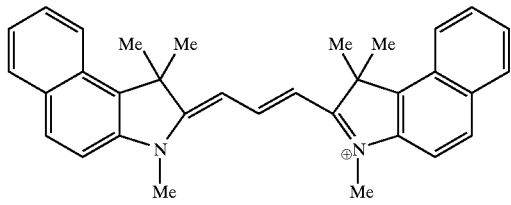 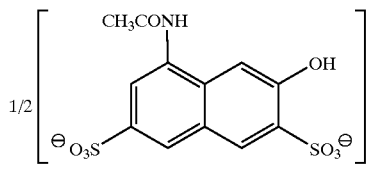
21'.
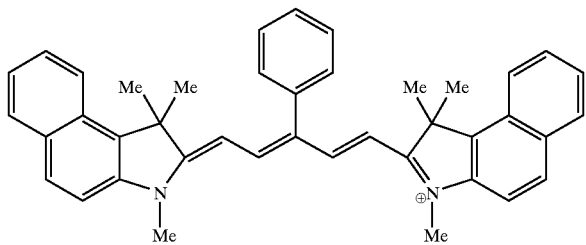 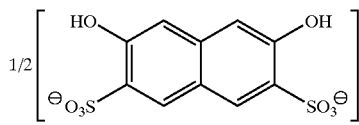
22'.
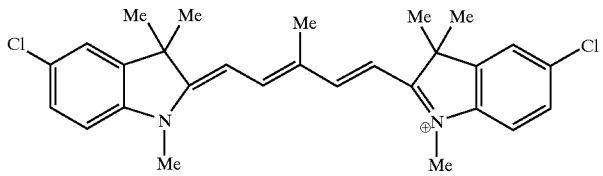 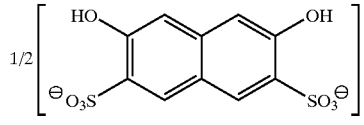
23'.
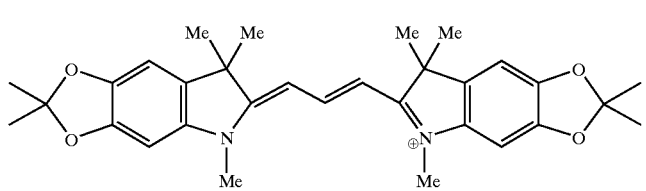 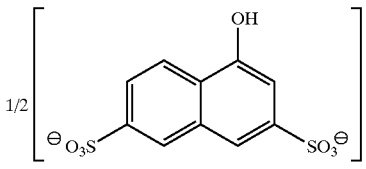

(24')
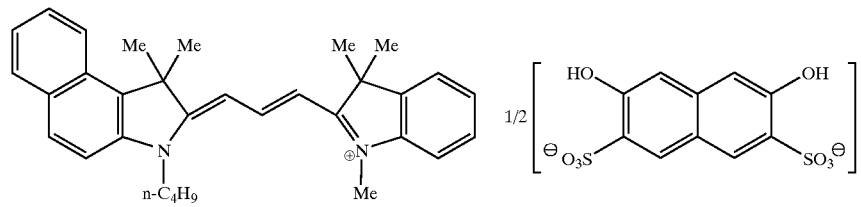
(25')
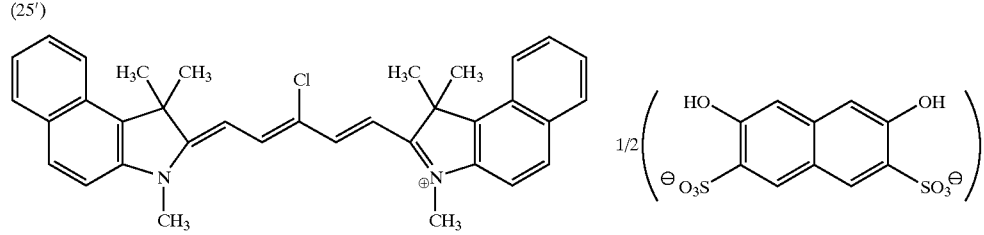
(26')
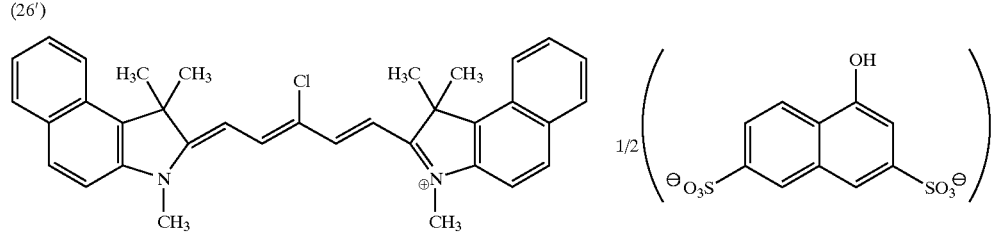
(27')
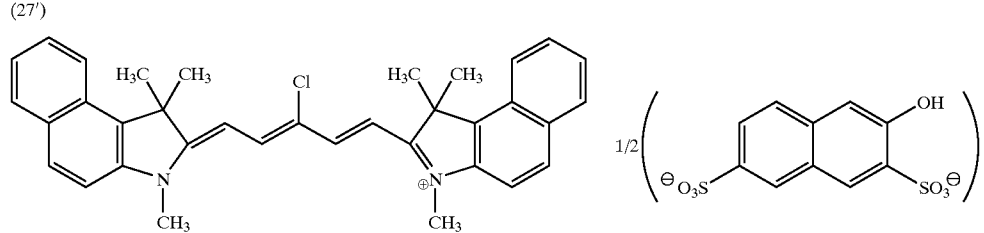
(28')
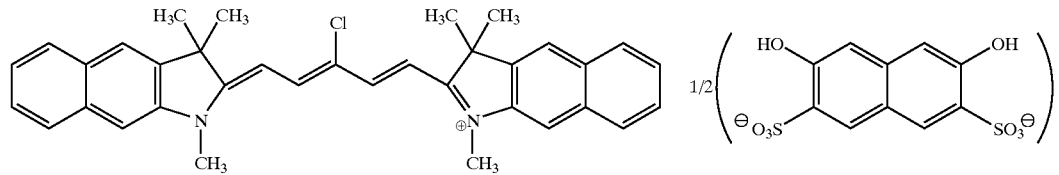
(29')
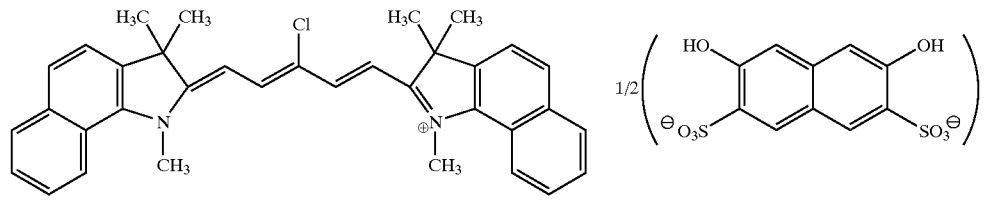

(30')

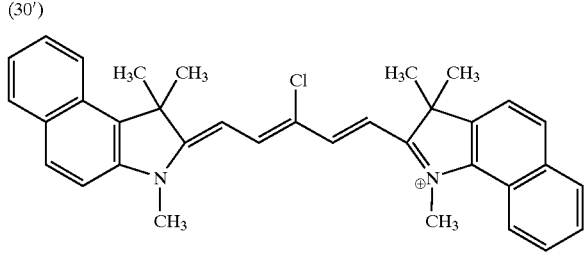 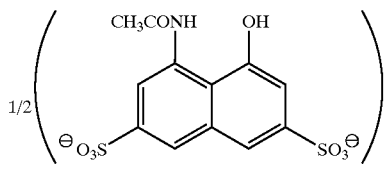

(31')

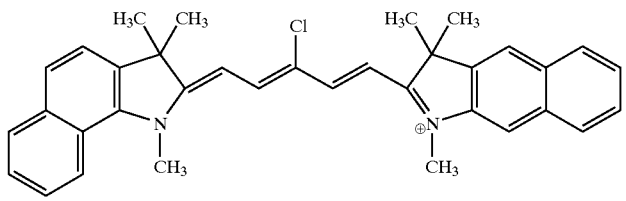 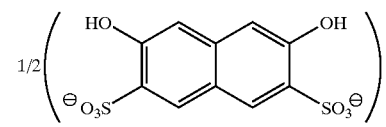

The compounds represented by formulas (III), (IV), (V) and (VI) according to this aspect of the invention may be used either alone or as a combination of two or more of them. The compounds represented by formulas (III), (IV), (V) and (VI) according to this aspect of the present invention can be easily synthesized with reference to descriptions of known literatures.

Examples of the literature include those enumerated above for the synthesis of compounds represented by formula (I).

As processes for introducing multivalent anions as counter ions, processes of dissolving the cyanine dyes having monovalent counter ions in appropriate solvents, adding solutions of multivalent acids or salts thereof thereto, and further adding solvents difficult to dissolve the dyes if necessary, thereby precipitating crystals of the cyanine dyes having multivalent ions as counter ions are most easy and suitable for synthesizing the compounds in large amounts. Other processes include processes for exchanging counter ions using ion exchange resins.

Synthesis methods of the compounds according to this aspect of the present invention is described in detail with reference to the following synthesis examples.

SYNTHESIS EXAMPLE 1

Synthesis of Example Compound 1':

Example compound 1' of the present invention was synthesized according to the following scheme:

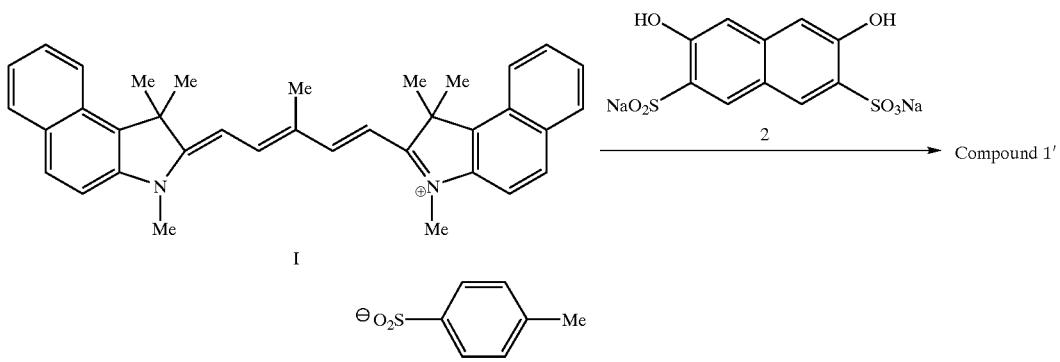

In 50 ml of methanol, 5.00 g of dye compound 1 was dissolved at 50° C. by stirring. To the resulting solution, 50 ml of an aqueous solution containing 1.64 g of compound 2 was added dropwise for 30 minutes, followed by cooling with ice water. Crystals precipitated were collected by filtration, and washed with water and methanol, followed by drying to obtain 4.50 g of example compound 1' as deep green crystals. The decomposition temperature thereof was 240° C.

SYNTHESIS EXAMPLE 2

Synthesis of Example Compound 2':

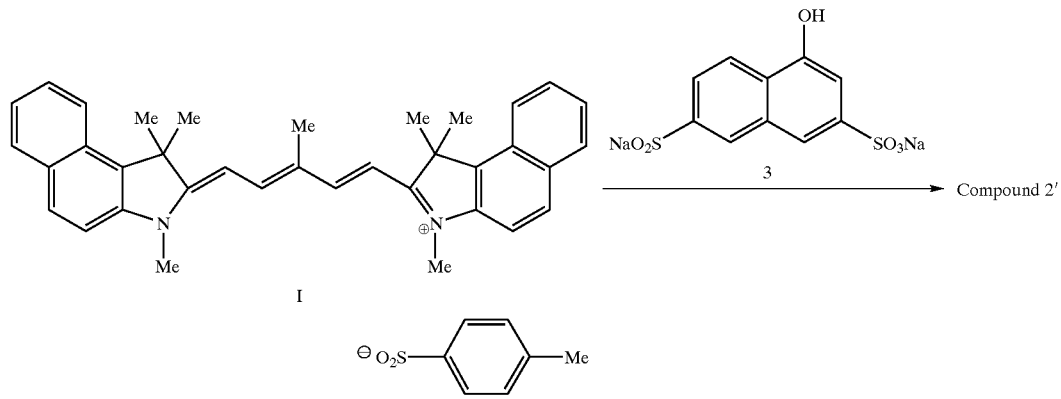

In 50 ml of methanol, 5.00 g of dye compound 1 was dissolved at 50° C. by stirring. To the resulting solution, 20 ml of an aqueous solution containing 3.90 g of compound 3 was added dropwise for 10 minutes, followed by cooling with ice water. Crystals precipitated were collected by filtration, and washed with water and methanol, followed by drying to obtain 4.45 g of example compound 2' as deep purple crystals. The decomposition temperature thereof was 256° C.

In the information-recording media of the present invention, the dyes represented by general formula (I) and the dyes represented by general formula (III) can be used in combination.

It is preferred that the information-recording media of the present invention contain compounds represented by the following formula (A1) or (A2) in the recording layers.

(A1)

(A2)

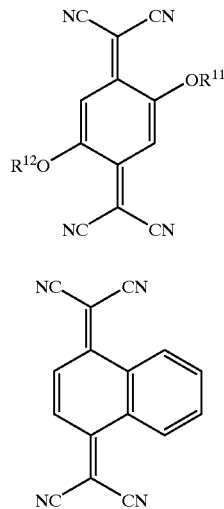

In formula (A1), $R^{11}$ and $R^{12}$ each independently represents a hydrocarbon group, and preferably an alkyl group having 1 to 18 carbon atoms, an alkenyl group having 2 to 18 carbon atoms, an alkynyl group having 2 to 18 carbon atoms or an aryl group having 6 to 14 carbon atoms. These hydrocarbon groups may have substituent groups, and examples of the substituent groups are the same as those described as the substituent groups for $R^{21}$ and $R^{22}$ in general formula (II). Preferred specific examples of the compounds represented by formula (A1) are shown below:

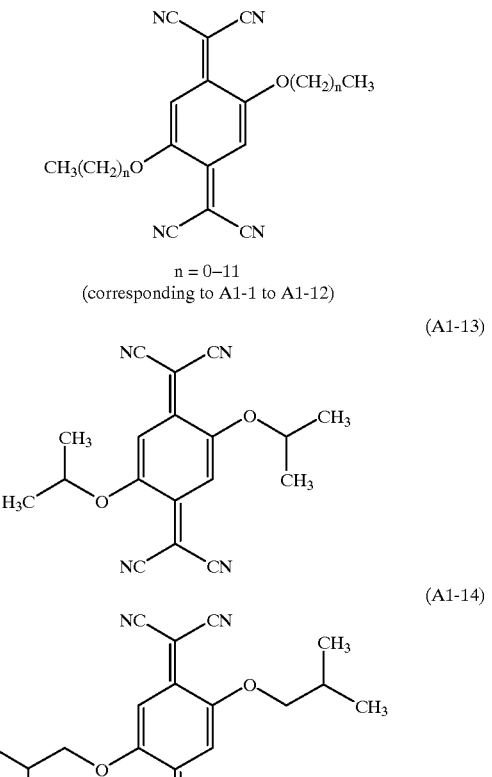

The compounds represented by formulas (A1) and (A2) according to the present invention may be used either alone or as a combination of two or more of them. Further, the compounds represented by formulas (A1) and (A2) according to the present invention can be easily synthesized by the method described in JP-A-10-151861.

The optical information-recording media of the present invention each comprises a substrate having thereon a recording layer containing the cyanine dye compound represented by formula (I) or the cyanine dye compound represented by general formula (III). The cyanine dye compounds according to the present invention can be advantageously used in CD-R or DVD-R media as optical information-recording media. As for the CD-R type optical information-recording media, cyanine dye compounds represented by formula (III), (IV) or (V) which have pentamethine chains are advantageously used. As for the DVD-R type optical information-recording media, on the other hand, cyanine dye compounds represented by general formula (IIA) which comprise indolenine or benzoindolenine nuclei having trimethine chains and cyanine dye compounds represented by fromula (III), (IV) or (V) which have trimethine chains are advantageously used.

It is preferred that the optical information-recording media of the present invention have the following constitution.

In the CD-R type optical information-recording medium, a transparent disk-shaped substrate having a diameter of 120±0.3 mm and a thickness of 1.2±0.2 mm on which pregrooves have been formed at a track pitch of 1.4 μm to 1.8 μm is preferably laminated with a recording layer, a light reflective layer and a resin protective layer in this order Further, the DVD-R type optical information-recording medium is preferably either of the following two embodiments.

(1) In one embodiment, the recording medium comprises: two sets of laminated products each comprising:

a transparent disk-shaped substrate having a diameter of 120±0.3 mm and a thickness of 0.6±0.1 mm on which pregrooves have been formed at a track pitch of 0.6 μm to 0.9 μm;

a recording layer provided on the substrate; and a light reflective layer provided on the recording layer, said two laminated products being adhered to each other, facing the respective recording layers inside (i.e., so that the respective substrate side thereof becomes outermost side), thereby constituting a medium having a thickness of 1.2±0.2 mm, (2) In the other embodiment, the recording medium comprises a single set of a laminated product comprising:

a transparent disk-shaped substrate having a diameter of 120±0.3 mm and a thickness of 0.6±0.1 mm on which pregrooves have been formed at a track pitch of 0.6 μm to 0.9 μm;

a recording layer provided on the substrate; and a light reflective layer provided on the recording layer, and further comprising a disk-shaped protective substrate having the same shape as the disk-shaped substrate, the laminated product and the protective substrate being adhered to each other, facing the recording layer inside (i.e., so that the substrate of the laminated product becomes outermost side), thereby constituting a medium having a thickness of 1.2±0.2 mm.

In the above-mentioned DVD-R type optical information-recording medium, a protective layer can be further provided on the light reflective layer.

Methods for producing the optical information-recording media is described below.

The DVD-R type optical information-recording media can be produced basically employing the materials for use in the production of the CD-R optical information-recording media, with the exception that substrates having formed, on one surface thereof, pregrooves at a narrower track pitch than those for the CD-R media for attaining a higher recording density are used. That is to say, the DVD-R optical information-recording medium can be produced by preparing two laminated products in each of which the recording layer, light reflective layer, and further optionally the protective layer are formed on the substrate in this order, and laminating these two laminated products to each other with an adhesive. Alternatively, the DVD-R optical information-recording medium can be produced by laminating a single set of the above-mentioned laminated product to a disk-shaped protective substrate having the same shape as the substrate of said laminated product with an adhesive. Accordingly, the DVD-R optical information-recording media can be produced in the same manner as for the CD-R optical information-recording media, except for the final step (a step of laminating two sets of laminated products or laminating a laminated product with a protective substrate).

The optical information-recording media of the present invention can be formed, for example, with the following constitutions.

The substrate of the optical information-recording media can be appropriately selected from various materials used as the substrates of the conventional optical information-recording media. The material for the substrate includes, for example, glass; polycarbonates; acrylic resins such as polymethyl methacrylate; vinyl chloride resins such as polyvinyl chloride and vinyl chloride copolymers; epoxy resins; amorphous polyolefins; and polyesters. They may be used in combination as so desired. These materials can be used in the film form or in the rigid substrate form. Of the above-mentioned materials, polycarbonates are preferred in terms of moisture resistance, dimension stability and cost.

The disk-shaped protective substrate may be formed with the material as exemplified above for the substrate.

An undercoat layer may be provided on the surface of the substrate on which the recording layer is to be formed, for improving smoothness, enhancing adhesion and protecting the recording layer. Materials for the undercoat layer include, for example, polymers such as polymethyl methacrylate, acrylic acid-methacrylic acid copolymers, styrene-maleic anhydride copolymers, polyvinyl alcohol, N-methylolacrylamide, styrene-vinyltoluene copolymers, chlorosulfonated polyethylene, nitrocellulose, polyvinyl chloride, chlorinated polyolefins, polyesters, polyimides, vinyl acetate-vinyl chloride copolymers, ethylene-vinyl acetate copolymers, polyethylene, polypropylene and polycarbonates; and surface modifiers such as silane coupling agents.

The undercoat layer can be formed by dissolving or dispersing the above-mentioned material in an appropriate solvent to prepare a coating solution, and applying the resulting coating solution to the surface of the substrate by a coating method such as spin coat, dip coat and extrusion coat. The thickness of the undercoat layer is generally within the range of 0.005 μm to 20 μm, and preferably within the range of 0.01 μm to 10 μm.

Grooves for tracking or unevenness (pregrooves) for expressing information such as address signals are usually formed on the substrate (or undercoat layer). It is preferred that these pregrooves are formed, directly on the substrate, upon injection molding or extrusion molding the resin materials such as polycarbonates. The pitch (track pitch) of the pregrooves varies depending on whether the recording medium is of CD-R type or of DVD-R type. Usually, in the CD-R type, the pregrooves are preferably formed at a track pitch width of 1.4 μm to 1.8 μm. In the DVD-R type, the pregrooves are preferably formed at a track pitch width of 0.6 μm to 0.9 μm.

The depth of the pregrooves preferably ranges from 300 Å to 2000 Å, and the half-width thereof preferably ranges from 0.2 μm to 0.9 μm. The use of the pregrooves having a depth ranging from 1500 Å to 2000 Å can improve the sensitivity without a substantial reduction in reflectance, which is particularly advantageous to the production of the CD-R type optical information-recording media.

The dye recording layer is provided on the substrate.

The dye recording layers contain the cyanine dye compound represented by general formula (I) or the cyanine dye compound represented by general formula (III) described above. Dyes other than the cyanine dye compounds represented by general formula (I) or (III) and other compounds may be used in combination with the compounds according to the present invention Preferred examples of the dye which can be used in combination in the recording layer include dicarbocyanine dyes containing benzoindolenine nuclei, which are particularly preferred when used in the CD-R media.

The recording layer preferably further contains various compounds known as singlet oxygen quenchers for improving the light resistance of the recording layer.

As the singlet oxygen quenchers, those described in already known publications such as patent specifications can be employed.

Specific examples thereof include those described in JP-A-58-175693, JP-A-59-81194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-63-209995, JP-A-4-25492, JP-B-1-38680 (the term "JP-B" as used herein means an "examined Japanese patent publication"), JP-B-6-26028, German Patent 350,399 and *Journal of the Chemical Society of Japan,* page 1141, October 1992.

The recording layer can be formed by dissolving the above-mentioned dye and further optionally the quencher and a binder in a solvent to prepare a coating solution, and then, applying the coating solution onto the surface of the substrate to form a coating, followed by drying.

The solvent for the coating solution for the dye recording layer include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane; ethers such as tetrahydrofuran, ethyl ether and dioxane; alcohols such as ethanol, n-propanol, isopropanol, n-butanol and diacetone alcohol; fluorine solvents such as 2,2,3,3-tetrafluoropropanol; and glycol ethers such as ethylene glycol monomethyl ether, ethylene glycol monoethyl ether and propylene glycol monomethyl ether. The above-mentioned solvents can be appropriately used alone or as a combination of two or more of them, considering the solubility of the dye to be used.

Various additives such as antioxidants, UV absorbers, plasticizers and lubricants may further added to the coating solution, depending on the purpose.

When a binder is used, examples thereof include natural organic polymers such as gelatin, cellulose derivatives, dextran, rosin and rubber; and synthetic organic polymers such as hydrocarbon resins such as polyethylene, polypropylene, polystyrene and polyisobutylene, vinyl resins such as polyvinyl chloride, polyvinylidene chloride and vinyl chloride-vinyl acetate copolymers, acrylic resins such as polymethyl acrylate and polymethyl methacrylate, polyvinyl alcohol, chlorinated polyethylene, epoxy resins, butyral resins, rubber derivatives, and initial condensation products of thermosetting resins such as phenol-formaldehyde resins.

When the binder is used as the material for the dye recording layer in combination with the dye, the weight amount of the binder is generally from 0.01 time to 50 times, preferably from 0.1 time to 5 times, the weight of the dye used.

The concentration of the dye in the coating solution thus prepared is generally from 0.01% to 10% by weight, and preferably from 0.1% to 5% by weight.

Examples of the coating method include spray coating methods, spin coating methods, dip coating methods, roll coating methods, blade coating methods, doctor roll coating methods and screen print methods.

The recording layer may be either monolayer or multi-layers. The thickness of the recording layer is generally within the range of 20 nm to 500 nm, and preferably within the range of 50 nm to 300 nm.

The light reflective layer can be provided on the recording layer for improving the reflectance upon replaying recorded information.

Light reflective materials, which are used as materials for the light reflective layer, are materials having a high reflectance to the laser beams, and examples thereof include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. Of these, preferred are Cr, Ni, Pt, Cu, Ag, Au, Al and stainless steel. They may be used either alone or as a combination of two or more of them. Further, they may also be used as alloys.

The light reflective layer can be formed on the recording layer, for example, by vapor deposition, sputtering or ion plating of the above-mentioned light reflective material. The thickness of the light reflective layer is generally within the range of 10 nm to 300 nm, and preferably within the range of 50 nm to 200 nm On the light reflective layer, a protective layer may be provided for protecting the recording layer physically and chemically. In the case of the production of the DVD-R type optical information-recording media, it is not necessarily required that the protective layer is provided.

Examples of materials for use in the protective layer include inorganic materials such as SiO, $SiO_2$, $MgF_2$, $SnO_2$ and $Si_3N_4$, and organic materials such as thermoplastic resins, thermosetting resins and UV-curing resins.

The protective layer can be formed, for example, by laminating the reflective layer with a film obtained by extrusion of a plastic through an adhesive. Alternatively, it may be provided by methods such as vacuum vapor deposition, sputtering and coating. In the case of the thermoplastic resins or the thermosetting resins, the protective layer can also be formed by dissolving these resins in an appropriate solvent to prepare a coating solution, and then, applying the resulting coating solution onto the reflective layer, followed by drying. In the case of the UV-curing resins, the resins can be applied as such, or dissolved in an appropriate solvent to prepare a coating solution, which are applied, followed by irradiation of UV light to cure the resins, thereby forming the protective layer. Various additives such as antistatic agents, antioxidants and UV absorbers may be added to these coating solutions depending on their purpose.

The thickness of the protective layer is generally within the range of 0.1 µm to 100 µm.

According to the above-mentioned processes, the laminated products in which the recording layers, the light reflective layers and the protective layers are provided on the substrates can be produced.

The CD-R type optical information-recording media can be produced according to the above-mentioned processes.

Further, the DVD-R type optical information-recording media can be produced by adhering two sets of the laminated products produced as described above to each other with an adhesive, facing the recording layers inside (i.e., so that the respective substrate becomes outermost side). Alternatively, the DVD-R type optical information-recording media can be produced by adhering the laminated product produced as described above to the disk-shaped protective substrate having the same shape as the substrate of the laminated product with an adhesive, facing the recording layer inside (i.e., so that the substrate of the laminated product becomes outermost side).

The method for recording optical information of the present invention can be carried out using the above-mentioned optical information-recording medium, for example, in the following manner.

First, the optical information-recording medium is irradiated from the substrate side thereof with light for recording such as a semiconductor laser beam, while rotating the medium at a constant linear speed (1.2 m/second to 14 m/second in case for the CD format) or at a constant angular speed. It is considered that this light irradiation results in the formation of cavities in the interface of the recording layer and the reflective layer (the cavities are formed, accompanying the deformation of the recording layer or the reflective layer, or the deformation of both layers), or in the building-up deformation of the substrate, or in changes in the index of refraction due to the discoloration of the recording layer or changes in the association state, which causes recording of information.

As the recording light, the semiconductor laser beam having an oscillation wavelength ranging from 500 nm to 850 nm is generally used.

In the present invention, the semiconductor laser beam having an oscillation wavelength ranging from 770 nm to 790 nm is suitably used for the CD-R media, and the semiconductor laser beam having an oscillation wavelength ranging from 630 nm to 680 nm is suitably used for the DVD-R media. Preferred is a red laser beam having an oscillation wavelength ranging from 635 nm to 645 nm.

The information recorded as described above can be replayed by irradiating the optical information-recording media from the substrate side thereof with the semiconductor laser beam, while rotating the media at the same constant linear speed as described above, and detecting the reflective light thereof.

The present invention will be illustrated in further detail with reference to the following Examples, but the invention should not be construed as being limited thereto.

EXAMPLE 1

Cyanine dye compound 41 was dissolved in 2,2,3,3-tetrafluoropropanol to obtain a coating solution for a recording layer. This coating solution was applied by spin coating onto a surface of a polycarbonate substrate (diameter: 120 mm, thickness: 0.6 mm) on which surface spiral pregrooves (track pitch: 0.8 µm, groove width: 0.4 µm, groove depth: 0.15 µm) had been formed beforehand by injection molding. Thus, a recording layer (thickness (in the grooves): about 200 nm) was formed.

Au was sputtered on the recording layer to form a light reflective layer having a thickness of about 100 nm. Thus, a laminated product was prepared in which the recording layer, and the light reflective layer were formed on the substrate in this order.

Separately, a transparent polycarbonate substrate (disk-shaped protective substrate) (diameter: 120 mm, thickness: 0.6 mm) was prepared. Then, the laminated product obtained above was adhered to the disk-shaped protective substrate with an adhesive (manufactured by Three Bond) so that the recording layer was faced inside (i.e., the substrate of the laminated product became an outermost side).

By the above-mentioned processes, a DVD-R type optical information-recording medium (having a thickness of 1.2 mm) according to the present invention was obtained.

EXAMPLE 2

A DVD-R type optical information-recording medium according to the present invention was obtained in the same manner as in Example 1, with the exception that cyanine dye compound 6 was used in the same amount in place of the above-mentioned compound 41 used in Example 1.

COMPARATIVE EXAMPLE 1

A DVD-R type optical information-recording medium for comparison was obtained in the sane manner as in Example 1, with the exception that the cyanine dye compound (compound C-1 for comparison) shown below (in which the monovalent anion shown below was combined with the cyanine dye monovalent cation moiety shown below) was used in the same amount in place of the above-mentioned compound 41 used in Example 1.

Compound C-1 for Comparison:

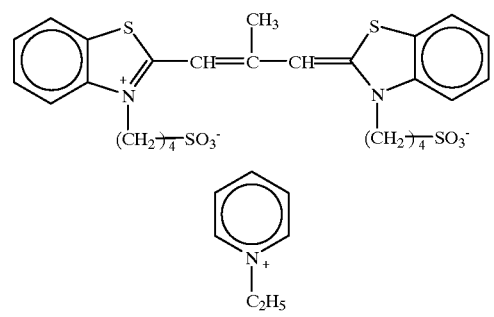

COMPARATIVE EXAMPLE 2

A DVD-R type optical information-recording medium for comparison was obtained in the same manner as in Example 1, with the exception that the cyanine dye compound (compound C-2 for comparison) shown below (in which the monovalent anion shown below was combined with the cyanine dye monovalent cation moiety shown below) was used in the same amount in place of the above-mentioned compound 41 used in Example 1.

Compound C-2 for Comparison:

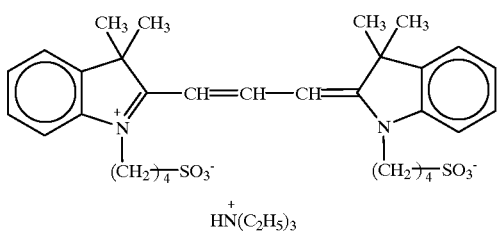

Evaluation as Optical Information-recording Media

Each of the optical information-recording media obtained was irradiated with a semiconductor laser beam having a wavelength of 635 nm condensed with a lens of NA of 0.6 to record a signal at a linear speed of 3.68 m/s, at a modulation frequency of 4 MHz, followed by the measurement of C/N. Further, each of the optical information-recording media was irradiated with the light of a Xe lamp (140,000 luxes) for 8 hours, similarly followed by the measurement of C/N.

The results of the evaluation obtained are shown in Table 2.

TABLE 2

| | | C/N (dB) at Recording Power of 8 mW | |
|---|---|---|---|
| | Dye No. | Before Light Irradiation | After Light Irradiation |
| Example 1 | 41 | 50 | 48 |
| Example 2 | 6 | 48 | 47 |
| Comparative Example 1 | C-1 | 49 | 32 |
| Comparative Example 2 | C-2 | 48 | 33 |

The results shown in Table 2 prove that the DVD-R media (Examples 1 and 2) having recording layers containing the cyanine dye compounds according to the present invention in each of which the divalent anion is combined with the two cyanine dye monovalent cations have high light resistance, as compared with the DVD-R media (Comparative Examples 1 and 2) having the recording layers containing the conventional cyanine dye compounds.

In view of the above results, it can be concluded as follows. The use of the cyanine dye compounds according to the present invention in which the cyanine dye cation moieties are combined can provide the optical information-recording media showing high C/N. In particular, even the use of visible region laser beams results in no decrease in C/N, so that the cyanine dye compounds according to the present invention can be considered as useful for the DVD-R media. Further, even when the specific cyanine dye compounds according to the present invention are applied to the CD-R media, they can be used advantageously for improvement in light resistance.

EXAMPLE 3

A cyanine dye compound of the present invention and an anti-fading agent having an amount of 10% by weight based on the cyanine dye compound were dissolved in 2,2,3,3-tetrafluoropropanol to obtain a coating solution for forming a recording layer. This coating solution was applied by spin coating onto a surface of a polycarbonate substrate (diameter: 120 mm, thickness: 0.6 μm) on which surface spiral pregrooves (track pitch: 1.6 μm, groove width: 0.4 μm, groove depth: 0.17 μm) had been formed beforehand by injection molding. Thus, a recording layer (thickness (in the grooves): about 200 nm) was formed.

Then, silver was sputtered on the recording layer to form a light reflective layer having a thickness of about 100 nm. Further, an UV-curing resin (UV Curing Agent 3070, manufactured by Three Bond) was applied onto the light reflective layer, and irradiated with an ultraviolet ray to form a protective layer having a thickness of 3 μm. By the above-mentioned process, CD-R type optical information-recording media CD-R1 to CD-R7 according to the present invention were obtained.

Further, optical information-recording media A to D for comparison were obtained in the same manner as described above with the exception that cyanine dye compounds for comparison were used in place of the cyanine dye compounds of the present invention. The compounds used in the optical information-recording media thus prepared are shown in Table 3 below.

| Recording Medium No. | Anti-Fading Agent | Cyanine Dye Compound |
|---|---|---|
| CD-R1 | A1-2 | 1' |
| CD-R2 | A1-2 | 2' |
| CD-R3 | A1-1 | 3' |
| CD-R4 | A1-3 | 4' |
| CD-R5 | A1-4 | 5' |
| CD-R6 | A1-13 | 14' |
| CD-R7 | A1-14 | 22' |
| Comparison A | A1-2 | C-21 |
| Comparison B | A1-1 | C-22 |
| Comparison C | Not added | C-21 |
| Comparison D | Not added | C-23 |

The structures of C-21, C-22 and C-23 used for comparison in Table 3 are shown below:

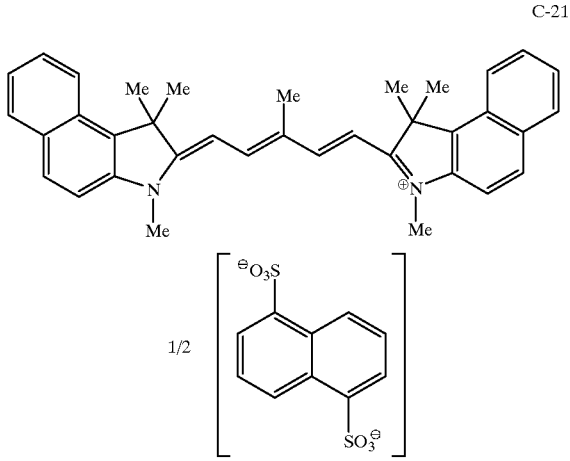

-continued

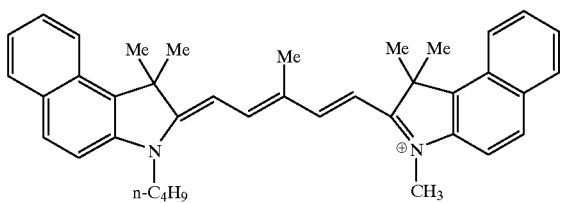
C-22

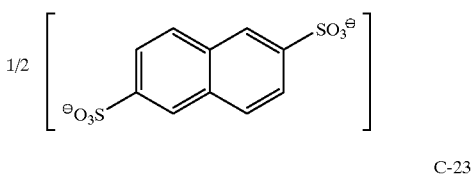
1/2

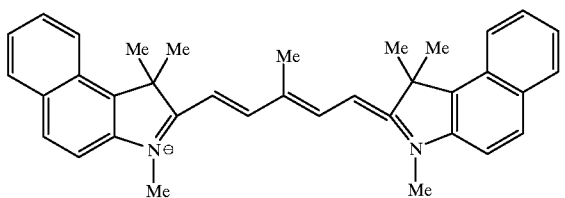
C-23

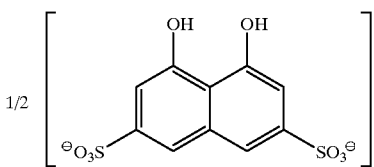
1/2

Evaluation of Optical Information-recording Media

A 3T-EMF signal was recorded on each of the optical information-recording media prepared, with a laser beam having a wavelength of 780 nm at a quadruple speed, and then, irradiated with a xenon lamp (140,000 luxes) under the circumstances of 80° C. and 85% RH for 48 hours. The recording characteristics before and after the irradiation were measured by an OMT 2000 manufactured by Pathsteck Co. The results of the evaluation obtained are shown in Table 4.

The results shown in Table 4 reveal that the CD-R media (CD-R1 to CD-R7) comprising the recording layers containing the cyanine dye compounds according to the present invention show high reflectance and high degree of modulation, as compared with the CD-R media (Comparisons A to D) having the conventional recording layers not containing the cyanine dye compounds, which allows acquisition of high signal strength at high sensitivity. Further, in view of the low jitter values and low block error values before and after light irradiation, it can be understood that the CD-R media according to the present invention have high fastness, thereby being able to retain the feature that reading errors hardly occur even under enforced conditions.

EXAMPLE 4

A cyanine dye compound of the present invention and an anti-fading agent having an amount of 10% by weight based on the cyanine dye compound were dissolved in 2,2,3,3-tetrafluoropropanol to obtain a coating solution for forming a recording layer. This coating solution was applied by spin coating onto a surface of a polycarbonate substrate (diameter: 120 mm, thickness: 0.6 mm) on which surface spiral pregrooves (track pitch: 0.8 μm, groove width: 0.4 μm, groove depth; 0.15 μm) had been formed beforehand by injection molding. Thus, a recording layer (thickness (in the groove portions): about 200 nm) was formed.

Silver was sputtered on the recording layer to form a light reflective layer having a thickness of about 100 nm. Thus, a laminated product was prepared in which the recording layer and the light reflective layer were formed on the substrate in this order. Separately, a transparent polycarbonate substrate (disk-shaped protective substrate) (diameter: 120 mm, thickness: 0.6 mm) was prepared. Then, the laminated product obtained above was adhered to the disk-shaped protective substrate with an adhesive (manufactured by Three Bond) so that the recording layer was faced inside (i.e., the substrate of the laminated product became an outermost side) (thickness: 1.2 mm). By the above-mentioned process, DVD-R type optical information-recording media DVD-R1 to DVD-R6 according to the present invention were obtained. Further, optical information-recording media E, F and G for comparison were obtained in the same manner as described above with the exception that cyanine dye compounds for comparison were used in place of the cyanine dye compounds of the present invention. The compounds used in the optical information-recording media thus prepared are shown in Table 5.

TABLE 4

| Recording Medium No. | Unrecorded Area Reflectance (%) | Degree of Modulation (Recording Power: 7 mW) | Jitter (ns) | | Block Error | |
|---|---|---|---|---|---|---|
| | | | Before Irradiation | After Irradiation | Before Irradiation | After Irradiation |
| CD-R1 | 75 | 55 | 6.1 | 7.0 | 0 | 0 |
| CD-R2 | 74 | 53 | 6.3 | 7.1 | 0 | 0 |
| CD-R3 | 74 | 54 | 6.2 | 7.2 | 0 | 0 |
| CD-R4 | 72 | 51 | 6.3 | 7.1 | 0 | 0 |
| CD-R5 | 72 | 50 | 6.1 | 7.5 | 0 | 0 |
| CD-R6 | 70 | 49 | 6.6 | 7.7 | 0 | 5 |
| CD-R7 | 72 | 48 | 6.7 | 8.0 | 0 | 10 |
| Comparison A | 70 | 48 | 7.5 | 11.2 | 0 | 22 |
| Comparison B | 68 | 45 | 7.8 | 12.3 | 0 | 30 |
| Comparison C | 65 | 42 | 8.0 | 25.1 | 0 | 52 |
| Comparison D | 69 | 47 | 7.4 | 11.6 | 0 | 25 |

TABLE 5

| Recording Medium No. | Anti-Fading Agent | Cyanine Dye Compound |
|---|---|---|
| DVD-R1 | Al-1 | 16 |
| DVD-R2 | Al-2 | 16 |
| DVD-R3 | Al-1 | 17 |
| DVD-R4 | Al-2 | 18 |
| DVD-R5 | Al-13 | 19 |
| DVD-R6 | Al-14 | 20 |
| Comparison E | Al-1 | C-24 |
| Comparison F | Al-2 | C-24 |
| Comparison G | Not added | C-24 |

Dye compound C-24 used for comparison in Table 5 is shown below:
C-24:

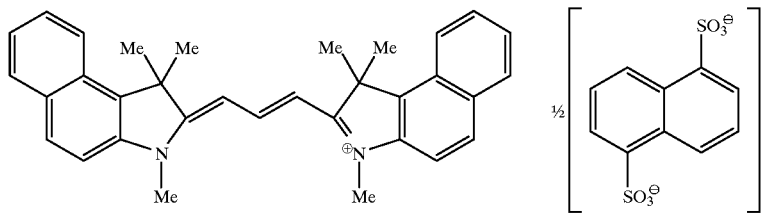

Evaluation of Optical Information-recording Media

Each of the optical information-recording media prepared was irradiated with a semiconductor laser beam having a wavelength of 635 nm condensed with a lens of NA of 0.6 to record a signal at a linear speed of 3.68 m/s, at a modulation frequency of 4 MHz. Further, each of these was irradiated with a xenon lamp (140,000 luxes) under the circumstances of 80° C. and 85% RH for 48 hours. The recording characteristics thereof before and after the irradiation were measured. Results of evaluation obtained are shown in Table 6.

TABLE 6

| Recording Medium No. | Unrecorded Area Reflectance (%) | Degree of Modulation (Recording Power: 7 mW) | Jitter (ns) Before Irradiation | Jitter (ns) After Irradiation | Block Error Before Irradiation | Block Error After Irradiation |
|---|---|---|---|---|---|---|
| DVD-R1 | 70 | 0.68 | 8.2 | 9.1 | 0 | 0 |
| DVD-R2 | 69 | 0.65 | 8.3 | 9.2 | 0 | 0 |
| DVD-R3 | 68 | 0.65 | 8.3 | 9.1 | 0 | 0 |
| DVD-R4 | 68 | 0.63 | 8.5 | 9.3 | 0 | 0 |
| DVD-R5 | 65 | 0.62 | 8.3 | 9.4 | 0 | 0 |
| DVD-R6 | 66 | 0.63 | 8.5 | 9.5 | 0 | 0 |
| Comparison E | 65 | 0.58 | 9.8 | 11.0 | 0 | 30 |
| Comparison F | 64 | 0.55 | 9.5 | 10.8 | 0 | 31 |
| Comparison G | 64 | 0.56 | 10.2 | 24.8 | 0 | 55 |

The results shown in Table 6 reveal that the DVD-R media (DVD-R1 to DVD-R6) comprising the recording layers containing the cyanine dye compounds according to the present invention show high reflectance and high degree of modulation, as compared with the DVD-R media (Comparisons E, F and G) having the conventional recording layers not containing the cyanine dye compounds, which allows acquisition of high signal strength at high sensitivity. Further, in view of the low jitter values and low block error values before and after light irradiation, it can be understood that the DVD-R media according to the present invention have high fastness, thereby being able to retain the feature that reading errors hardly occur even under enforced conditions.

While the invention has been described in detail and with reference to specific examples thereof, it will be apparent to one skilled in the art that various changes and modifications can be made therein without departing from the spirit and scope thereof.

What is claimed is:

1. A heat mode optical information-recording medium comprising a substrate having thereon a recording layer on which information can be recorded by laser irradiation, wherein said recording layer contains a cyanine dye compound represented by the following general formula (I):

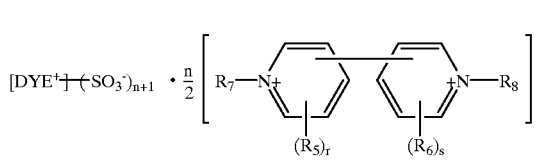

(I)

wherein DYE$^+$ represents a monovalent cyanine dye cation; n represents an integer of 1 or more; $R_5$ and $R_6$ each independently represents a substituent group; $R_7$ and $R_8$ each independently represents an alkyl group, an alkenyl group, an alkynyl group, an aralkyl group, an aryl group or a heterocyclic group; $R_5$ and $R_6$, $R_5$ and $R_7$, $R_6$ and $R_8$ or $R_7$ and $R_8$ may be connected to each other to form a ring; and r and s each independently represents an integer of from 0 to 4 and when r or s is 2 or more, a plurality of $R_5$ groups and a plurality of $R_6$ groups may, respectively, be the same or different from each other.

2. The optical information-recording medium according to claim 1, wherein said cyanine dye cation is represented by the following general formula (II):

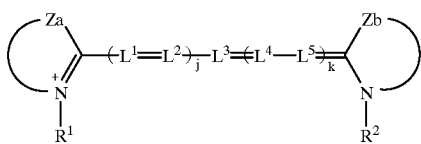

wherein Za and Zb each independently represents an atomic group necessary for completing a 5- or 6-membered nitrogen-containing heterocycle; $R^1$ and $R^2$ each independently represents an alkyl group or an aryl group; $L^1$, $L^2$, $L^3$, $L^4$ and $L^5$ each independently represents a substituted or unsubstituted methine group, with the proviso that when substituent groups exist on $L^1$ to $L^5$, they may be connected to each other to form a ring; j represents 0, 1 or 2; and k represents 0 or 1.

3. The optical information-recording medium according to claim 1, wherein said cyanine dye cation is represented by the following general formula (IIA);

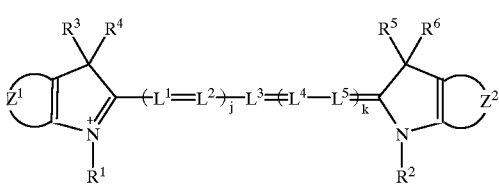

wherein $Z^1$ and $Z^2$ each independently represents an atomic group necessary for completing an indolenine nucleus or a benzoindolenine nucleus; $R^1$ and $R^2$ each independently represents an alkyl group or an aryl group; $R^3$, $R^4$, $R^5$ and $R^6$ each independently represents an alkyl group; $L^1$, $L^2$, $L^3$, $L^4$ and $L^5$ each independently represents a substituted or unsubstituted methine group, with the proviso that when substituent groups exist on $L^1$ to $L^5$, they may be connected to each other to form a ring; j represents 0, 1 or 2; and k represents 0 or 1.

4. The optical information-recording medium according to claim 1,
wherein said substrate is a transparent disk-shaped substrate having a diameter of 120±0.3 mm, a thickness of 1.2±0.2 mm and pregrooves formed on one surface thereof at a track pitch of 1.4 μm to 1.8 μm, and
wherein said recording layer is provided on the pregroove-formed surface of the substrate.

5. The optical information-recording medium according to claim 1,
wherein said substrate is a transparent disk-shaped substrate having a diameter of 120±0.3 mm, a thickness of 0.6±0.1 mm and pregrooves formed on one surface thereof at a track pitch of 0.6 μm to 0.9 μm, and
wherein said recording layer is provided on the pregroove-formed surface of the substrate.

6. The optical information-recording medium according to claim 5, which comprises two sets of said substrate each having thereon the recording layer, wherein said two sets of the substrate are laminated so that the respective substrate side thereof becomes outermost side.

7. The optical information-recording medium according to claim 5, further comprising a disk-shaped protective substrate having the same shape as said disk-shaped substrate, said disk-shaped protective substrate being provided on the recording layer side.

8. The optical information-recording medium according to claim 1, further comprising a light reflective metal layer provided on the recording layer.

9. A method for recording information, comprising irradiating an optical information-recording medium with a laser beam having a wavelength of 630 nm to 680 nm, wherein said optical information-recording medium is one according to claim 1.

10. An optical information-recording medium comprising a substrate having thereon a recording layer on which information can be recorded by laser irradiation,
wherein said recording layer contains a cyanine dye compound represented by the following general formula (III):

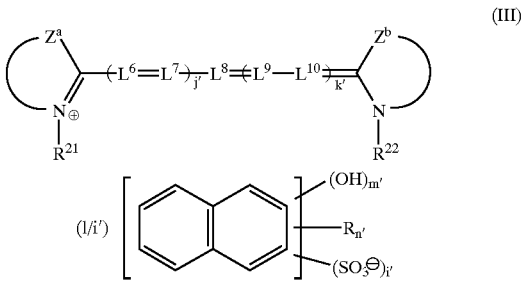

wherein $Z^a$ and $Z^b$ each independently represents an atomic group necessary for completing a 5- or 6-membered nitrogen-containing heterocycle; $R^{21}$ and $R^{22}$ each independently represents a substituted or unsubstituted alkyl group or a substituted or unsubstituted aryl group; $L^6$, $L^7$, $L^8$, $L^9$ and $L^{10}$ each independently represents a substituted or unsubstituted methine group, with the proviso that when substituent groups exist on $L^6$ to $L^{10}$, they may be connected to each other to form a ring; R represents a substituent group; i' represents an integer of from 2 to 7; j' represents 0, 1 or 2; k' represents 0 or 1; m' represents an integer of from 1 to 4, and when m' is 2, the substitution positions of the two hydroxyl groups are the 2- and 7-positions; n' represents an integer of 0 to 7; m'+n'+i' is 8 or less; when n' is 2 or more, a plurality of R groups may be the same or different; and when m'=i'=2, two hydroxyl groups are not each concurrently substituted at the 1- and 8-positions.

11. The optical information-recording medium according to claim 10, wherein said cyanine dye compound of formula (III) is a compound represented by the following formula (IV):

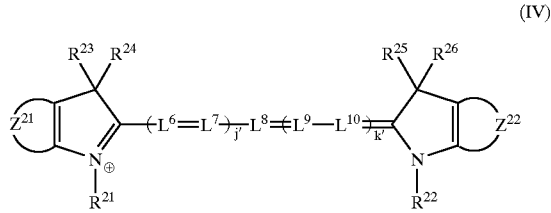

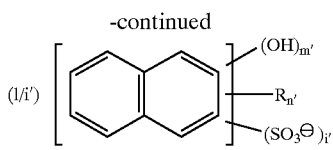

wherein $Z^{21}$ and $Z^{22}$ each independently represents an atomic group necessary for forming an indolenine nucleus or a benzoindolenine nucleus; $R^{21}$ and $R^{22}$ each independently represents a substituted or unsubstituted alkyl group or a substituted or unsubstituted aryl group; $R^{23}$, $R^{24}$, $R^{25}$ and $R^{26}$ each independently represents a substituted or unsubstituted alkyl group; and $L^6$, $L^7$, $L^8$, $L^9$, $L^{10}$, R, i', j', k', m' and n' respectively have the same meanings as defined for general formula (III).

12. The optical information-recording medium according to claim 10, wherein said cyanine dye compound of formula (III) is a compound represented by the following formula (V):

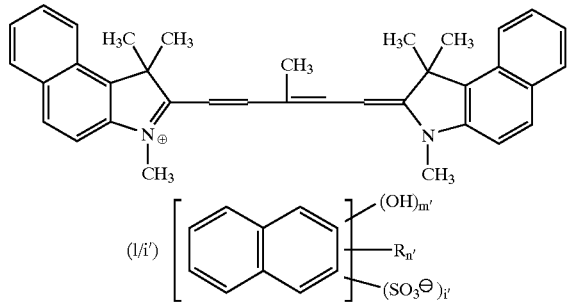

wherein R, i', m' and n' respectively have the same meanings as defined for general formula (III).

13. The optical information-recording medium according to claim 10,
wherein said substrate is a transparent disk-shaped substrate having a diameter of 120±0.3 mm, a thickness of 1.2±0.2 mm and pregrooves formed on one surface thereof at a track pitch of 1.4 μm to 1.8 μm, and
wherein said recording layer is provided on the pregroove-formed surface of the substrate.

14. The optical information-recording medium according to claim 10, wherein said cyanine dye compound of formula (III) is a compound represented by the following formula (VI):

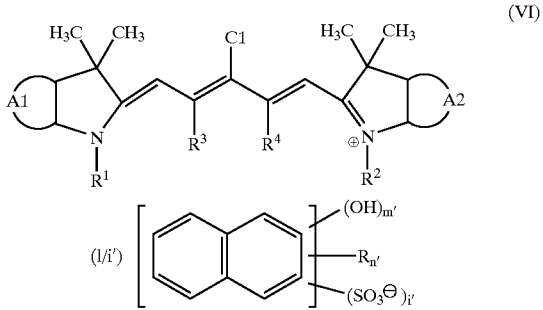

wherein A1 and A2 each independently represents a naphthalene condensed ring, $R^1$ and $R^2$ each independently represents an alkyl group, $R^3$ and $R^4$ each independently represents a hydrogen atom or an alkyl group which may have a substituent, provided that $R^3$ and $R^4$ may be connected to each other to form a ring, and R, i', m' and n' have the same meaning as defined for formula (III), respectively.

15. An optical information-recording medium comprising:
a substrate having thereon a recording layer on which information can be recorded by laser radiation, wherein said substrate is a transparent disk-shaped substrate having a diameter of 120±3.0 mm a thickness of 0.6±0.1 mm and pregrooves formed on one surface thereof at a track pitch of 0.6 μm to 0.9 μm, and
wherein said recording layer is provided on the pregroove-formed surface of the substrate and contains a cyanine dye compound represented by the following general formula (III):

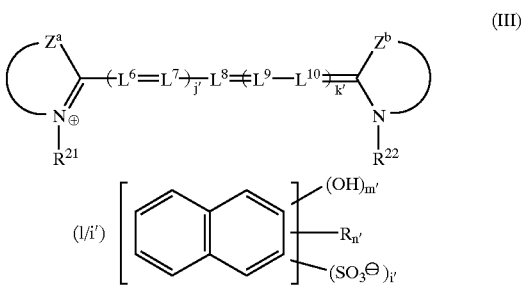

wherein $Z^a$ and $Z^b$ each independently represents an atomic group necessary for completing a 5- or 6-membered nitrogen-containing heterocycle; $R^{21}$ and $R^{22}$ each independently represents a substituted or unsubstituted alkyl group or a substituted or unsubstituted aryl group; $L^6$, $L^7$, $L^8$, $L^9$ and $L^{10}$ each independently represents a substituted or unsubstituted methine group, with the proviso that when substituent groups exist on $L^6$ to $L_{10}$, they may be connected to each other to form a ring; R represents a substituent group; i' represents an integer of from 2 to 7; j' represents 0, 1 or 2; k' represents 0 or 1; m' represents an integer of from 1 to 4; n' represents an integer of 0 to 7; m'+n'+i' is 8 or less; when n' is 2 or more, a plurality of R groups may be the same or different; and when m'=i'=2, two hydroxyl groups are not each concurrently substituted at the 1- and 8-positions.

16. The optical information-recording medium according to claim 15, which comprises two sets of said substrate each having thereon the recording layer, wherein said two sets of the substrate are laminated so that the respective substrate side thereof becomes outermost side.

17. The optical information-recording medium according to claim 15, further comprising a disk-shaped protective substrate having the same shape as said disk-shaped substrate, said disk-shaped protective substrate being provided on the recording layer side.

18. The optical information-recording medium according to claim 15, further comprising a light reflective metal layer provided on the recording layer.

19. The optical information-recording medium according to claim 15, wherein said cyanine dye compound of formula (III) is a compound represented by the following formula (IV):

(IV)

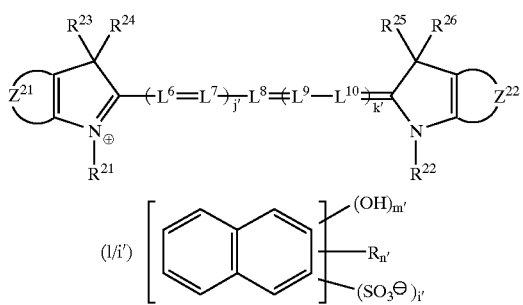

wherein $Z^{21}$ and $Z^{22}$ each independently represents an atomic group necessary for forming an indolenine nucleus or a benzoindolenine nucleus; $R^{21}$ and $R^{22}$ each independently represents a substituted or unsubstituted alkyl group or a substituted or unsubstituted aryl group; $R^{23}$, $R^{24}$, $R^{25}$ and $R^{26}$ each independently represents a substituted or unsubstituted alkyl group; and $L^6$, $L^7$, $L^8$, $L^9$, $L^{10}$, R, i', j', k', m' and n' respectively have the same meanings as defined for general formula (III).

20. The optical information-recording medium according to claim 15, wherein said cyanine dye compound of formula (III) is a compound represented by the following formula (V):

(V)

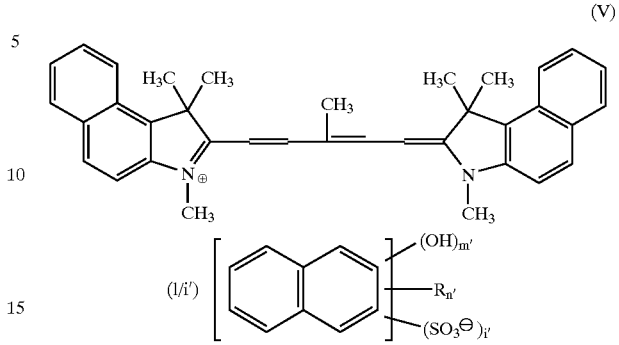

wherein R, i', m' and n' respectively have the same meanings as defined for general formula (III).

21. A method for recording information, comprising irradiating an optical information-recording medium with a laser beam having a wavelength of 770 nm to 790 nm, wherein said optical information-recording medium is one according to claim 1.

* * * * *